(12) United States Patent
Zhou

(10) Patent No.: US 12,385,274 B1
(45) Date of Patent: Aug. 12, 2025

(54) SWIMMING POOL CLEANING ROBOT

(71) Applicant: Tuhui Shengchuang Enterprise Management (Suzhou) Partnership (Limited Partnership), Suzhou (CN)

(72) Inventor: Wenting Zhou, Suzhou (CN)

(73) Assignee: TUHUI SHENGCHUANG ENTERPRISE MANAGEMENT (SUZHOU) PARTNERSHIP (LIMITED PARTNERSHIP), Suzhou (CN)

( * ) Notice: Subject to any disclaimer, the term of this patent is extended or adjusted under 35 U.S.C. 154(b) by 0 days.

(21) Appl. No.: 19/169,489

(22) Filed: Apr. 3, 2025

Related U.S. Application Data

(63) Continuation of application No. 19/031,837, filed on Jan. 18, 2025.

(30) Foreign Application Priority Data

Dec. 21, 2024 (CN) .......................... 202423172376.9

(51) Int. Cl.
| | | |
|---|---|---|
| *E04H 4/16* | (2006.01) | |
| *A46B 13/00* | (2006.01) | |
| *A46B 13/02* | (2006.01) | |
| *A46B 15/00* | (2006.01) | |
| *C02F 1/00* | (2023.01) | |
| *C02F 103/42* | (2006.01) | |

(52) U.S. Cl.
CPC ......... *E04H 4/1654* (2013.01); *A46B 13/001* (2013.01); *A46B 13/02* (2013.01); *A46B 15/0004* (2013.01); *C02F 1/001* (2013.01); *A46B 2200/3073* (2013.01); *C02F 2103/42* (2013.01)

(58) Field of Classification Search
CPC ..... E04H 4/1654; A46B 13/001; A46B 13/02; A46B 15/0004
See application file for complete search history.

(56) References Cited

FOREIGN PATENT DOCUMENTS

| | | | | |
|---|---|---|---|---|
| CN | 115234051 A | * | 10/2022 | ........... E04H 4/1654 |
| CN | 218709488 U | | 3/2023 | |
| CN | 116517357 A | | 8/2023 | |
| CN | 220414991 U | | 1/2024 | |
| CN | 221722426 U | | 9/2024 | |
| CN | 119102399 A | | 12/2024 | |
| FR | 2925558 A1 | * | 6/2009 | ........... E04H 4/1654 |

* cited by examiner

*Primary Examiner* — Shay Karls
(74) *Attorney, Agent, or Firm* — Scully, Scott, Murphy & Presser, P.C.

(57) ABSTRACT

A swimming pool cleaning robot is provided. The swimming pool cleaning robot includes a body, a water absorbing assembly, a walking assembly, a transmission assembly, and a front rolling brush. The walking assembly includes a front walking wheel and a driving assembly, the front walking wheel is disposed close to a front end of the body, and the front rolling brush includes a first state and a second state. In a pool wall cleaning mode of the robot, when the body moves to the pool wall, a water discharge of the water absorbing assembly is reduced or closed, until the driving assembly drives the front rolling brush to switch.

20 Claims, 9 Drawing Sheets

SWIMMING POOL CLEANING ROBOT

CROSS-REFERENCE TO RELATED APPLICATION

This application is a continuation application of U.S. Ser. No. 19/031,837 filed on Jan. 18, 2025 which claims priority to Chinese Patent Application No. 202423172376.9 entitled "SWIMMING POOL CLEANING ROBOT" filed on Dec. 21, 2024, the entire content of which is incorporated herein by reference.

FIELD

This disclosure relates to the field of swimming pool cleaning technologies, and in particular, to a swimming pool cleaning robot.

BACKGROUND

Swimming pool cleaning is an important process for keeping water quality of a swimming pool clean and safe. Regular swimming pool cleaning can not only ensure cleanliness and hygiene of water, but also prolong a service life of a swimming pool device. Generally, cleaning work of a swimming pool mainly relies on manual cleaning or an automatic cleaning device. Because efficiency of the manual cleaning is relatively low, the automatic cleaning device is becoming more and more popular.

The automatic cleaning device introduces, by using a water absorbing assembly, water containing impurities from a water inlet to a filter assembly of a machine, and performs filtration processing to clean the swimming pool. The filter assembly, the water absorbing assembly, a driving motor driving assembly, and a transmission assembly are dispersed at various positions and heights of a robot, and an improper layout may reduce a cleaning ability of the robot.

For example, in a case, because a space layout among the assemblies is improper, effective dust collecting space of the filter assembly is limited. After the water absorbing assembly is started, water flows through the filter assembly for filtering, and a filtering position of a garbage basket is easily blocked. Alternatively, if the filter assembly is blocked, a front rolling brush may be far away from a cleaning surface, and the front rolling brush pulls a wheelie or the entire machine floats, affecting a cleaning effect of the entire machine, and increasing inconvenience of the user during using. In another case, because the space layout among the assemblies is improper, when the automatic swimming pool cleaning device is in a pool wall cleaning mode, the robot may first move from a pool bottom to a pool wall, and the front rolling brush may pull a wheelie before reaching the pool wall position. Alternatively, after the robot moves to the pool wall position, the front rolling brush has an excessively small area of contact with the wall, and the front rolling brush has a relatively small friction on the pool wall. Consequently, the wall at a joint position between the pool bottom and the pool wall cannot be cleaned, resulting in a poor pool wall cleaning capability.

SUMMARY

To resolve the prior-art problem in which a front rolling brush of an automatic swimming pool cleaning robot easily pulls a wheelie in advance before meeting a pool wall, and cannot satisfy a usage requirement of a user for an overall cleaning capability in a pool wall cleaning mode, this disclosure provides a swimming pool cleaning robot. Through a proper layout of each component, a probability that the front rolling brush pulls a wheelie before meeting the pool wall in the pool wall cleaning mode may be reduced, and an overall cleaning effect of the robot may be effectively improved.

To achieve the foregoing objective, embodiments of this disclosure provide the following technical solutions.

A first aspect of the embodiments of this disclosure provides a swimming pool cleaning robot, the swimming pool cleaning robot is able to move in water to perform cleaning, and the swimming pool cleaning robot includes:

a body, where along a forward direction of the robot, the body has a front end and a rear end, the body has a housing and an accommodating cavity, the housing is provided with a water inlet communicating with the accommodating cavity, and the water inlet is disposed on a lower surface of the housing;

a water absorbing assembly;

a filter assembly, where the filter assembly is disposed in the accommodating cavity, the filter assembly has a filter cavity, the filter assembly is provided with a dust port, the dust port communicates with the water inlet and the filter cavity, and the water absorbing assembly is configured to suck a water flow, so that a water flow containing impurities passes through the water inlet and the dust port, and is drained outside the housing through filtration of the filter cavity;

a walking assembly, where the walking assembly includes a front walking wheel, and the front walking wheel is rotatably disposed at the front end;

a driving assembly, where the driving assembly is close to the front end, the driving assembly includes a driving motor and a first output gear, the driving motor includes a motor rotation axis, and the motor rotation axis is connected to the first output gear;

a front rolling brush, where the front rolling brush is rotatably disposed at the front end, the front rolling brush is configured to clean a to-be-cleaned surface, the front rolling brush includes a first state and a second state, in the first state, the front rolling brush abuts against a pool wall and a pool bottom, and in the second state, the front rolling brush abuts against only the pool wall; and a transmission assembly, where the transmission assembly includes at least a rolling brush transmission group; the first output gear is in transmission connection with the front rolling brush by using the rolling brush transmission group; and the robot includes a pool wall cleaning mode, and in the pool wall cleaning mode, the body moves to the pool wall, and a water discharge of the water absorbing assembly is reduced, or the water absorbing assembly is turned off, until the driving assembly drives the front rolling brush to switch from the first state to the second state.

It should be further noted that, in this embodiment, the walking assembly may drive the body to move in a preset direction in water of a swimming pool, where "in water" includes underwater and water surface. "Underwater" indicates that the swimming pool cleaning robot is completely submerged below a water line, and "water surface" indicates that the swimming pool cleaning robot is at least partially exposed above the water line. The water absorbing assembly is configured to provide a suction force, so that a negative pressure is generated at a position of the water inlet on the housing. After the water absorbing assembly is started, under the action of the suction force, after the water flow containing impurities passes through the water inlet, the dust port, and the filter cavity, garbage in the water is retained in the filter cavity. The water flow filtered by the filter cavity is drained out of the housing.

Compared with the prior art, in this embodiment, both the driving assembly and the front walking wheel are close to the front end of the body. The front rolling brush is in transmission connection with the first output gear by using the rolling brush transmission group. Through cooperation of defining positions of the front rolling brush, the driving motor, and the front walking wheel, and transmission connection between all components and the transmission assembly, all components at a position of the front end of the body are arranged compactly, space of the filter assembly is increased, and mass at a position of the front rolling brush may be increased. After the water absorbing assembly is started, because the filter space of the filter assembly may effectively reduce a probability that the filter assembly is blocked, in this arrangement, in the pool wall cleaning mode, after the body moves to the pool wall, a water discharge of the water absorbing assembly is reduced or closed. In this way, an absorption force at a position of the water inlet may be reduced. Further, when the rolling brush is lifted relative to the pool bottom is actively controlled, and the contact area between the front rolling brush and the to-be-cleaned surface is increased during the process of assisting the front rolling brush in switching from the first state to the second state, thereby improving the cleaning effect of the swimming pool cleaning robot at the edge position of the pool bottom when switching between the pool wall and the pool bottom.

A second aspect of the embodiments of this disclosure provides a swimming pool cleaning robot that is able to move in water to perform cleaning, and the swimming pool cleaning robot includes: a body, where along a forward direction of the robot, the body has a front end and a rear end, the body has a housing and an accommodating cavity, the housing is provided with a water inlet communicating with the accommodating cavity, and the water inlet is disposed on a lower surface of the housing;
- a water absorbing assembly, where the water absorbing assembly is configured to suck a water flow from the water inlet into the accommodating cavity, and then drained to an outside of the housing;
- a walking assembly, where the walking assembly includes a front walking wheel, and the front walking wheel is rotatably disposed at the front end;
- a driving assembly, where the driving assembly is close to the front end, the driving assembly includes a driving motor and a first output gear, the driving motor includes a motor rotation axis, and the motor rotation axis is connected to the first output gear;
- a front rolling brush, where the front rolling brush is rotatably disposed at the front end, the front rolling brush is configured to clean a to-be-cleaned surface, the front rolling brush includes a first state and a second state, in the first state, the front rolling brush abuts against a pool wall and a pool bottom, and in the second state, the front rolling brush abuts against only the pool wall; and a transmission assembly, where the transmission assembly includes at least a rolling brush transmission group; the first output gear is in transmission connection with the front rolling brush by using the rolling brush transmission group; and
the robot includes a pool wall cleaning mode, and in the pool wall cleaning mode, the body moves to the pool wall, and a water discharge of the water absorbing assembly is reduced, or the water absorbing assembly is turned off, until the driving assembly drives the front rolling brush to switch from the first state to the second state, and the driving assembly drives the front rolling brush to move to the water line along the pool wall.

In this embodiment, both the driving assembly and the front walking wheel are close to the front end of the body. The front rolling brush is in transmission connection with the first output gear by using the rolling brush transmission group. Through cooperation of defining positions of the front rolling brush, the driving motor, and the front walking wheel, and transmission connection between all components and the transmission assembly, all components at a position of the front end of the body are arranged compactly, space of the filter assembly is increased, and mass at a position of the front rolling brush may be increased. The water absorbing assembly sucks a water flow, and in a process in which the water flow passes through the water inlet and the accommodating cavity, and is drained, a negative pressure may be formed at the water inlet of the swimming pool cleaning robot. In this way, in the pool wall cleaning mode, after the body moves to the pool wall, a water discharge of the water absorbing assembly is reduced or closed, the negative pressure at the water inlet can be reduced, and an absorption force of the swimming pool cleaning robot on the pool bottom or the pool wall may be reduced. Further, the swimming pool cleaning robot actively controls when the rolling brush is lifted relative to the pool bottom, effectively assists the front rolling brush in switching from the first state to the second state, increases the contact area between the front rolling brush and the to-be-cleaned surface, and better cleans a dead zone between the pool bottom and the pool wall, thereby improving the cleaning effect of the swimming pool cleaning robot at the edge position of the pool bottom when switching between the pool wall and the pool bottom.

According to the swimming pool cleaning device provided in this embodiment of this disclosure, the body is provided with a detection assembly, the detection assembly is configured to detect environment information, the environment information includes wall surface information of the pool wall, in a horizontal direction, a length of the swimming pool cleaning robot is L1, and in a vertical direction, a width of the swimming pool cleaning robot is W1; and
- in the pool wall cleaning mode, the body moves to the pool wall. In a case that the pool wall is a first wall surface, and when the robot is unable to continue to move toward a water line along the first wall surface, the front walking wheel and the front rolling brush move to a side away from the first wall surface; and in a case that the pool wall is a second wall surface, the front walking wheel and the front rolling brush continue to move toward the water line along the second wall surface, until the robot reaches the water line, where along the forward direction of the robot, the first wall surface is a concave arc surface, the first wall surface has an access opening, a maximum value of a vertical caliber of the access opening is L2, a maximum value of a horizontal caliber of the access opening is W2, L2>L1, W2>W1, and the second wall surface is a vertical wall.

It should be further noted that, in this embodiment, the detection assembly is configured to collect environment information in the swimming pool, and the swimming pool cleaning robot adjusts a motion mode and a cleaning mode of the body by using the environment information collected by the detection assembly. In this embodiment, after the detection assembly detects the environment information, both the driving motor and the front walking wheel are close to the front end of the body, the front walking wheel is in transmission connection with the first output gear by using a walking wheel transmission group, and the front rolling brush is in transmission connection with the first output gear by using the rolling brush transmission group. Through cooperation of defining positions of the front rolling brush, the driving motor, and the front walking wheel, and transmission connection between all components and the transmission assembly, all components at a position of the front end of the body are arranged compactly. Compared with other positions of the swimming pool cleaning robot, mass at a position of the front rolling brush may be increased. In this arrangement, in the pool wall cleaning mode, after the body moves to the pool wall, in a case that the pool wall is a first wall surface, and when the robot is unable to continue to move toward a water line along the first wall surface, the front walking wheel and the front rolling brush move to a side away from the first wall surface, to increase a contact area between the front rolling brush and the pool wall. In this way, a boundary position between the first wall surface and the pool bottom may be cleaned, and energy consumption of the cleaning robot may be effectively reduced. When the pool wall is the second wall surface, that is, when the pool wall is a vertical wall, a water discharge of the water absorbing assembly is reduced or closed, so that an absorption force at the position of the water inlet is reduced. Further, when the rolling brush is lifted relative to the pool bottom is actively controlled, and a contact area between the front rolling brush and the to-be-cleaned surface is increased during a process of assisting the front rolling brush in switching from the first state to the second state, thereby improving the cleaning effect of the swimming pool cleaning robot at the edge position of the pool bottom when switching between the pool wall and the pool bottom.

According to the swimming pool cleaning device provided in this embodiment of this disclosure, in a vertical direction, a rotation axis of the front walking wheel is located in a first plane, a bottom of the front walking wheel is located in a second plane, and a rotation axis of the first output gear is located between the first plane and the second plane; and connection lines between a rotation center of the first output gear, a rotation center of the front walking wheel, and a rotation center of the front rolling brush form three angles, where an angle using the rotation center of the front walking wheel as a vertex is a first angle $\beta$, and $\beta<150°$.

It should be further noted that, in this embodiment, both the driving motor and the front walking wheel are close to the front end of the body. The front walking wheel is in transmission connection with the first output gear by using the walking wheel transmission group. The front rolling brush is in transmission connection with the first output gear by using the rolling brush transmission group, so that the first angle $\beta<150°$. Further, the front rolling brush, the driving motor, the front walking wheel, and the first output gear are concentrated at the front end of the body and are close to the bottom of the body, so that all components at the position of the front rolling brush and the front end of the body are arranged more compactly. In this arrangement, when the robot is in a pool bottom cleaning mode or the pool wall cleaning mode, the front rolling brush can be effectively prevented from lifting relative to the pool bottom under unexpected circumstances, which is helpful to increase the contact area between the front rolling brush and the to-be-cleaned surface, and improve the cleaning effect of the swimming pool cleaning robot at a dead zone between the pool bottom and the pool wall when switching between the pool wall and the pool bottom.

According to the swimming pool cleaning device provided in this embodiment of this disclosure, in the pool wall cleaning mode, when the front rolling brush abuts against only the pool wall, the water absorbing assembly is started, or a water discharge of the water absorbing assembly is increased.

In this embodiment, in the pool wall cleaning mode, when the front rolling brush abuts against only the pool wall, the water discharge of the water absorbing assembly is increased, a suction force at the bottom of the entire robot is improved, a contact area between the front rolling brush and the pool wall is further increased, and a friction force between the front rolling brush and the pool wall is increased, thereby improving a cleaning effect of the front rolling brush on the pool wall, improving stability of the body moving on the pool wall, and preventing the robot from sliding from the pool wall to the pool bottom.

According to the swimming pool cleaning device provided in this embodiment of this disclosure, the transmission assembly further includes a walking wheel transmission group, the first output gear is in transmission connection with the front walking wheel by using the walking wheel transmission group, the rolling brush transmission group includes an internal gear, the first output gear is located on an inside of the front walking wheel, the internal gear is disposed on an inner wall of the front walking wheel, and the first output gear is in meshing transmission with the internal gear.

It should be further noted that the first output gear is located on the inside of the front walking wheel and is in meshing transmission with the internal gear to drive the front walking wheel to rotate relative to the body, drive the body to move relatively, and may further limit the position of the first output gear, so that the driving motor and the first output gear are further concentrated on a side of the front walking wheel, and a spatial integration effect of the front end of the body is improved.

According to the swimming pool cleaning device provided in this embodiment of this disclosure, the rolling brush transmission group includes a first external gear, a second external gear, and a rolling brush transmission gear, the first external gear is disposed on the inside of the front walking wheel and rotates coaxially with the front walking wheel in a same direction, an outer diameter of the first external gear is smaller than an inner diameter of the internal gear, the rolling brush transmission gear is disposed on a rotation axis of the front rolling brush, the second external gear is disposed between the first external gear and the rolling brush transmission gear, and the second external gear is in meshing transmission with the first external gear and the rolling brush transmission gear.

It should be further noted that, the first external gear, the second external gear, and the rolling brush transmission gear are concentrated at the front end of the body, so that a rotation direction of the first output gear is the same as a rotation direction of the front rolling brush and the front walking wheel, that is, the first output gear, the front rolling brush, and the front walking wheel simultaneously rotate clockwise or simultaneously rotate anticlockwise, thereby facilitating control on the rotation direction of the front rolling brush, and facilitating the robot to calculate the rotation direction of the front walking wheel, to measure a mileage of the robot.

According to the swimming pool cleaning device provided in this embodiment of this disclosure, in a vertical direction, a rotation center of the front walking wheel is located in the first plane, a bottom of the front walking wheel is located in the second plane, the rotation center of the front walking wheel, a rotation center of the second external gear, and a rotation center of the rolling brush transmission gear are all located between the first plane and the second plane, and a rotation center of the first output gear is located in the first plane, or the rotation center of the first output gear is located between the first plane and the second plane.

It should be further noted that, the front walking wheel, the second external gear, the first output gear, and the rolling brush transmission gear are enabled to close to the second plane, to further improve stability at a position at which the front end of the body is close to the bottom, and further raise the front rolling brush.

According to the swimming pool cleaning device provided in this embodiment of this disclosure, in a vertical direction, a rotation center of the front walking wheel is located in the first plane, a bottom of the front walking wheel is located in the second plane, the rotation center of the front walking wheel, a rotation center of the second external gear, and a rotation center of the rolling brush transmission gear are all located between the first plane and the second plane, and along a vertical upward direction, a rotation axis of the first output gear is located above the first plane. It should be further noted that, in this embodiment, the front walking wheel, the second external gear, and the rolling brush transmission gear are close to the second plane, so that the first output gear is located above the first plane and is in transmission connection with the internal gear, and the first output gear, the front rolling brush, and the front walking wheel simultaneously rotate clockwise or simultaneously rotate anticlockwise, thereby facilitating control on the rotation direction of the front rolling brush, and facilitating the robot to calculate the rotation direction of the front walking wheel, to measure a mileage of the robot.

According to the swimming pool cleaning device provided in this embodiment of this disclosure, the first external gear is integrally formed with the front walking wheel.

It should be further noted that, in this embodiment, the inner wall of the front walking wheel is provided with the internal gear, and the rotation center of the front walking wheel is provided with the first external gear and is in transmission connection with the internal gear by using the first external gear. After the first output gear drives the internal gear to rotate, synchronous rotation of the first external gear and the front walking wheel can be implemented, thereby improving stability of the transmission assembly in a transmission process.

According to the swimming pool cleaning device provided in this embodiment of this disclosure, the first external gear is detachably connected to the front walking wheel, the rolling brush transmission group in the transmission assembly further includes a second output gear, the second output gear and the first output gear are disposed on the motor rotation axis at an interval along an axial direction of the rotation axis of the driving motor, the first output gear and the second output gear rotate in a same direction, and the second output gear is in transmission connection with the first external gear.

It should be further noted that, in this embodiment, the front walking wheel is detachably connected to the first external gear. When the front walking wheel needs to be maintained, the first external gear does not need to be separated, thereby improving convenience during maintenance of the walking assembly. The second output gear is in transmission connection with the first external gear, so that the first output gear, the front rolling brush, and the front walking wheel simultaneously rotate clockwise or simultaneously rotate anticlockwise, thereby facilitating control on the rotation direction of the front rolling brush, and facilitating the robot to calculate the rotation direction of the front walking wheel, to measure a mileage of the robot. According to the swimming pool cleaning device provided in this embodiment of this disclosure, in a vertical direction, the first wall surface has a top, the top is located on an inside of the access opening, and a distance between the top and a horizontal plane on which the pool bottom is located is L3, where L3>L2.

In this embodiment, when L3>L2, the swimming pool cleaning robot cannot clean an arc surface between the top of the first wall surface and the top of the access opening, and the front walking wheel and the front rolling brush move to the side away from the first wall surface.

According to the swimming pool cleaning device provided in this embodiment of this disclosure, along a vertical upward direction, a curvature of the first wall surface gradually increases.

In this embodiment, because the curvature of the first wall surface gradually increases, and the front rolling brush gradually gets away from the first wall surface, the friction force between the front rolling brush and the first wall surface decreases. After recognizing a state of the first pool wall, the detection assembly may control the front walking wheel and the front rolling brush to move to the side away from the first wall surface.

In this embodiment, the swimming pool cleaning device includes a body, a water absorbing assembly, a filter assembly, a walking assembly, a transmission assembly, and a front rolling brush. The walking assembly includes a front walking wheel, a driving assembly and the front walking wheel are disposed close to a front end of the body, and the front rolling brush includes a first state and a second state. In a pool wall cleaning mode of the robot, when the body moves to the pool wall, a water discharge of the water absorbing assembly is reduced or closed, until the walking assembly drives the front rolling brush to switch from the first state to the second state. Compared with the prior art, the swimming pool cleaning device provided in this disclosure can improve effective filtering space of the filter assembly, and prevent the front rolling brush from pulling a wheelie before meeting the pool wall. When the swimming pool cleaning robot switches from the pool bottom to the pool wall, the contact area between the front rolling brush and the to-be-cleaned surface is increased, thereby improving an overall cleaning effect of the swimming pool cleaning robot.

BRIEF DESCRIPTION OF DRAWINGS

To describe technical solutions in embodiments of this disclosure or in the prior art more clearly, the following briefly describes accompanying drawings required for describing embodiments or the prior art. Apparently, the accompanying drawings in the following descriptions show some embodiments of this disclosure, and a person of ordinary skill in the art may still derive other drawings from these accompanying drawings without creative efforts.

Figure 1:
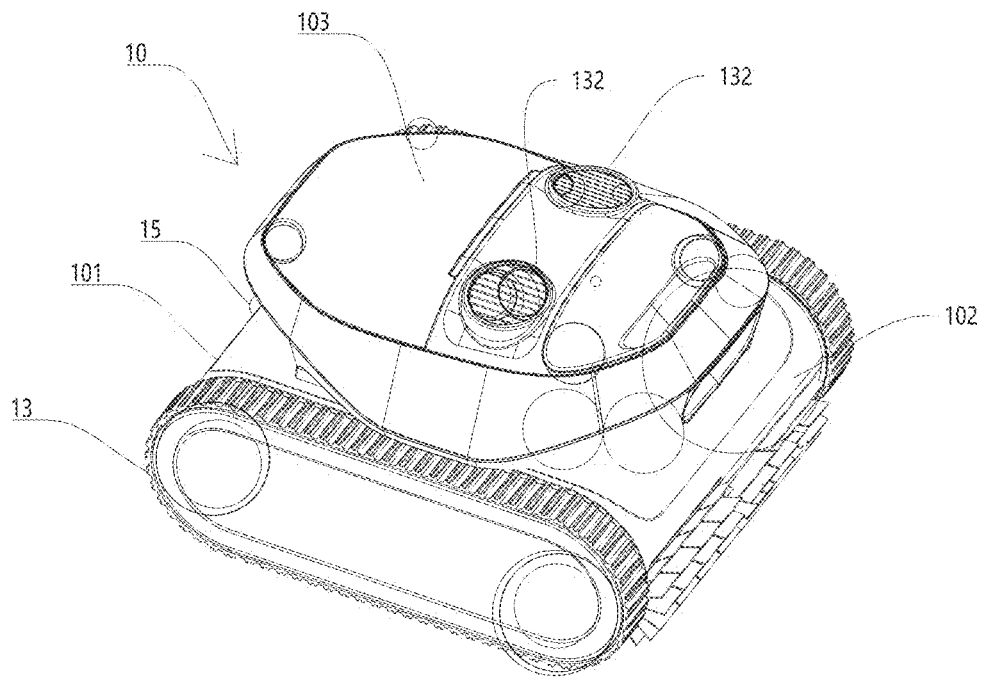
FIG. 1 is a schematic diagram of a structure of a swimming pool cleaning robot according to an embodiment of this disclosure.

DESCRIPTIONS OF REFERENCE NUMERALS 10. body;
101. front end; 102. rear end; 103. housing; 131. water inlet; 132. water outlet; 104. accommodating cavity; 105. detection assembly;
11. water absorbing assembly;
12. filter assembly; 121. filter cavity; 122. dust port;
13. walking assembly;
131. driving assembly; 1301. driving motor; 1311. motor rotation axis; 1312. first output gear;
1302. front walking wheel;
14. transmission assembly;
141. walking wheel transmission group; 1411. internal gear;
142. rolling brush transmission group; 1421. first external gear; 1422. second external gear; 1423. rolling brush transmission gear; 1424. second output gear;
15. front rolling brush;
16. first wall surface; 161. access opening; 17. second wall surface;
100. first state; 200. second state; 300. water line; 400. pool wall; 500. pool bottom; B. first angle;
18. first plane; and 19. second plane.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present invention rather than all of the embodiments. All other embodiments obtained by a person of ordinary skill in the art based on the disclosed embodiments without creative efforts shall fall within the protection scope of the present invention.

To reduce a probability that a front rolling brush 15 pulls a wheelie before meeting a pool wall 400 in a pool wall 400 cleaning mode of a swimming pool cleaning robot, improve effective space of a filter cavity 121 of a filter assembly 12, prevent the filter assembly 12 from being blocked, increase a contact area between the front rolling brush 15 and a to-be-cleaned surface, and further improve a cleaning effect of an edge position between the front rolling brush 15 and the pool wall 400 or between the pool wall 400 and a pool bottom 500.

In an operating state of the swimming pool cleaning robot, the front rolling brush 15 may mix dirty of the to-be-cleaned surface. With rotation of the front rolling brush 15, a water flow is driven to a position of the filter assembly 12, and a water absorbing assembly 11 generates a suction force, to drain a water flow containing impurities outside a housing 103 through filtration of a filter cavity 121 after passing through a water inlet 131 and a dust port 122. In this process, if the filter cavity 121 of the filter assembly 12 is blocked, a requirement for filtering the impurities in the water cannot be met, a negative pressure cannot be generated by the water absorbing assembly 11 at the water inlet 131, and the swimming pool cleaning robot cannot clean the pool wall 400, or in the pool wall 400 cleaning mode, the robot may slide down from the pool wall 400, resulting in a poor cleaning effect.

Embodiment 1

A first aspect of the embodiments of this disclosure provides a swimming pool cleaning robot, the swimming pool cleaning robot is able to move in water to perform cleaning, and the swimming pool cleaning robot includes:

a body 10, where along a forward direction of the robot, the body 10 has a front end 101 and a rear end 102, the body 10 has a housing 103 and an accommodating cavity 104, the housing 103 is provided with a water inlet 131 communicating with the accommodating cavity 104, and the water inlet 131 is disposed on a lower surface of the housing 103;

a water absorbing assembly 11;

a filter assembly 12, where the filter assembly 12 is disposed in the accommodating cavity 104 and is close to the rear end 102 of the housing 103, the filter assembly 12 has a filter cavity 121, the filter assembly 12 is provided with a dust port 122, the dust port 122 communicates with the water inlet 131 and the filter cavity 121, and the water absorbing assembly 11 is configured to suck a water flow, so that a water flow containing impurities passes through the water inlet 131 and the dust port 122, and is drained outside the housing 103 through filtration of the filter cavity 121;

a walking assembly 13, where the walking assembly 13 includes a front walking wheel 1302, and the front walking wheel 1302 is rotatably disposed at the front end 101;

a driving assembly 131, where the driving assembly 131 is close to the front end 101, the driving assembly includes a driving motor 1301 and a first output gear 1312, the driving motor 1301 includes a motor rotation axis 1311, and the motor rotation axis 1311 is connected to the first output gear 1312;

a front rolling brush 15, where the front rolling brush 15 is rotatably disposed at the front end 101, the front rolling brush 15 is configured to clean a to-be-cleaned surface, the front rolling brush includes a first state 100 and a second state 200, in the first state 100, the front rolling brush 15 abuts against a pool wall 400 and a pool bottom 500, and in the second state 200, the front rolling brush 15 abuts against only the pool wall 400; and a transmission assembly 14, where the transmission assembly 14 includes at least a rolling brush transmission group 142; the first output gear 1312 is in transmission connection with the front rolling brush 15 by using the rolling brush transmission group 142; and the robot includes a pool wall 400 cleaning mode, and in the pool wall 400 cleaning mode, the body 10 moves to the pool wall 400, and a water discharge of the water absorbing assembly 11 is reduced, or the water absorbing assembly 11 is turned off, until the driving assembly 131 drives the front rolling brush 15 to switch from the first state 100 to the second state 200.

In this embodiment, the walking assembly 13 may drive the body 10 to move in a preset direction in water of a swimming pool, where "in water" includes underwater and water surface. "Underwater" indicates that the swimming pool cleaning robot is completely submerged below a water line 300, and "water surface" indicates that the swimming pool cleaning robot is at least partially exposed above the water line 300. The water absorbing assembly 11 is configured to provide a suction force, so that a negative pressure is generated at a position of the water inlet 131 on the housing 103. After the water absorbing assembly 11 is started, under the action of the suction force, after the water flow containing impurities passes through the water inlet 131, the dust port 122, and the filter cavity 121, garbage in the water is retained in the filter cavity 121. The water flow filtered by the filter cavity 121 is drained out of the housing 103. In some embodiments, the housing 103 is provided with a water outlet 132, and a filtered water flow is drained out of the housing 103 through the water outlet 132. The water outlet 132 may be disposed at a top of the housing 103, or may be disposed at another position of the housing 103, a position of the water outlet 132 relative to the housing 103 is not limited in this embodiment and other embodiments, and a person skilled in the art may adjust the position of the water outlet according to an actual use situation, which are all fall within the scope of the examples of the embodiments of this disclosure. Further, the water absorbing assembly 11 provides a suction power for a water flow from the water inlet 131 to the water outlet 132.

Figure 2:
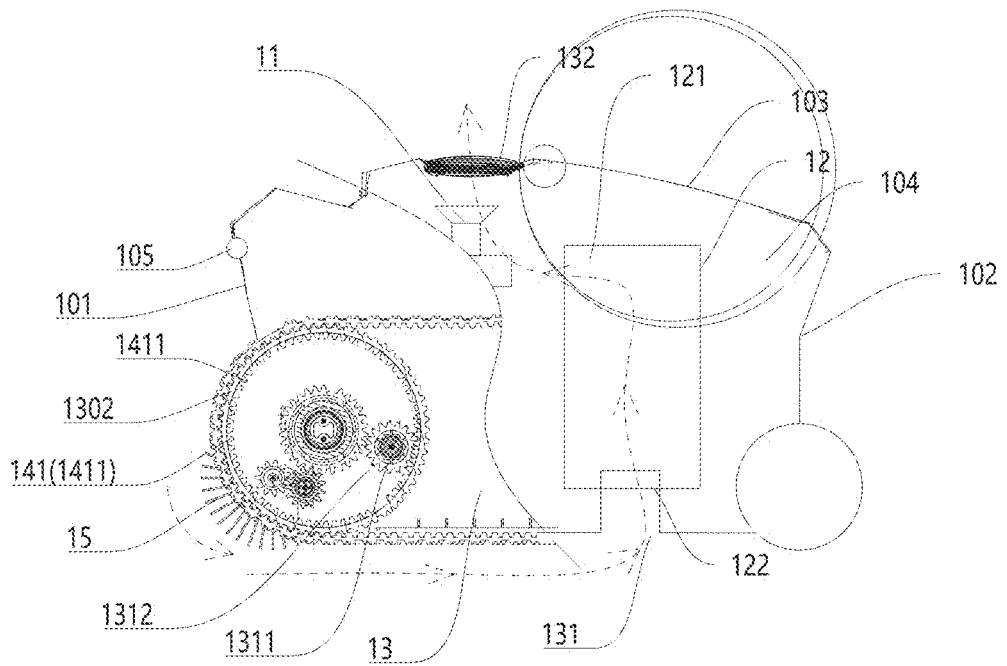
FIG. 2 is a schematic diagram of a partial sectional structure of a swimming pool cleaning robot according to an embodiment of this disclosure.
Figure 14:
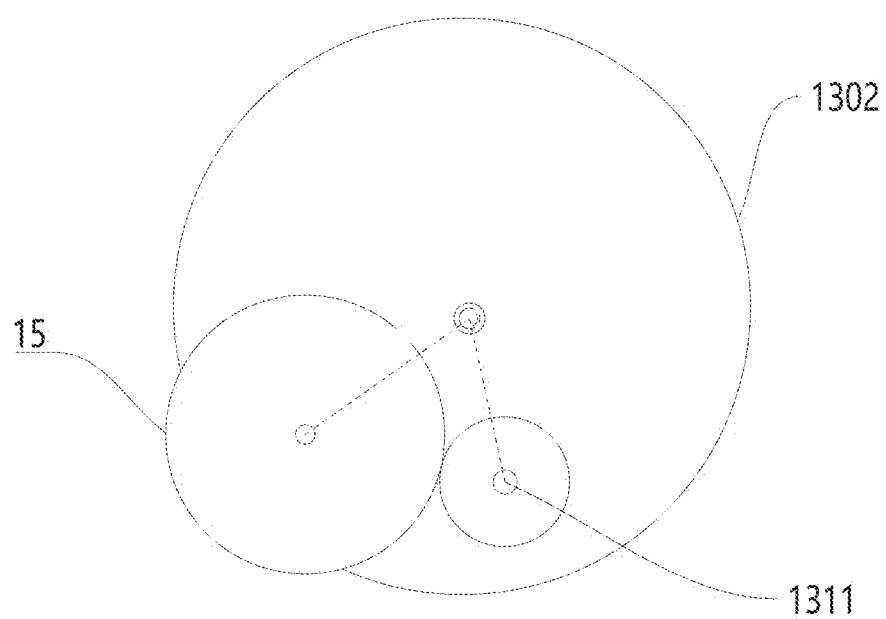
FIG. 14 is a schematic diagram of another simplified state in which a first output gear is in transmission connection with a transmission assembly of a swimming pool cleaning robot according to an embodiment of this disclosure.

In this embodiment, as shown in FIG. 1, FIG. 2, and FIG. 14, both the driving motor 1301 and the front walking wheel 1302 are close to the front end 101 of the body 10. The front walking wheel 1302 is in transmission connection with the first output gear 1312 by using the rolling brush transmission group 142, the front rolling brush 15 is in transmission connection with the first output gear 1312 by using a walking wheel transmission group 141. Through cooperation of defining positions of the front rolling brush 15, the driving motor 1301, and the front walking wheel 1302, and transmission connection of the transmission assembly 14, all components at a position of the front end 101 of the body 10 are arranged compactly, space of the filter assembly 12 is increased, and mass at a position of the front rolling brush 15 may be increased. After the water absorbing assembly 11 is started, because the filter space of the filter assembly 12 may effectively reduce a probability that the filter assembly 12 is blocked, in this arrangement, in the pool wall 400 cleaning mode, after the body 10 moves to the pool wall 400, a water discharge of the water absorbing assembly 11 is reduced or closed. In this way, an absorption force at a position of the water inlet 131 may be reduced. Further, when the rolling brush is lifted relative to the pool bottom 500 is actively controlled, and the contact area between the front rolling brush 15 and the to-be-cleaned surface is increased during the process of assisting the front rolling brush 15 in switching from the first state 100 to the second state 200, thereby improving the cleaning effect of the swimming pool cleaning robot at the edge position of the pool bottom 500 when switching between the pool wall 400 and the pool bottom 500, and better cleaning a dead zone between the pool bottom and the pool wall.

Further, the filter assembly 12 is disposed at a position close to the rear end 102 of the body 10, and the front rolling brush 15 and the driving assembly 131 are disposed at a position close to the front end 101 of the body 10, to provide larger space for the filter assembly 12 in the accommodating cavity 104. The following further describes, with reference to the accompanying drawings of the specification, each state of the swimming pool cleaning robot in which the swimming pool cleaning robot starts to climb a wall and clean the pool wall 400 in the pool wall 400 cleaning mode in detail.

Figure 3:
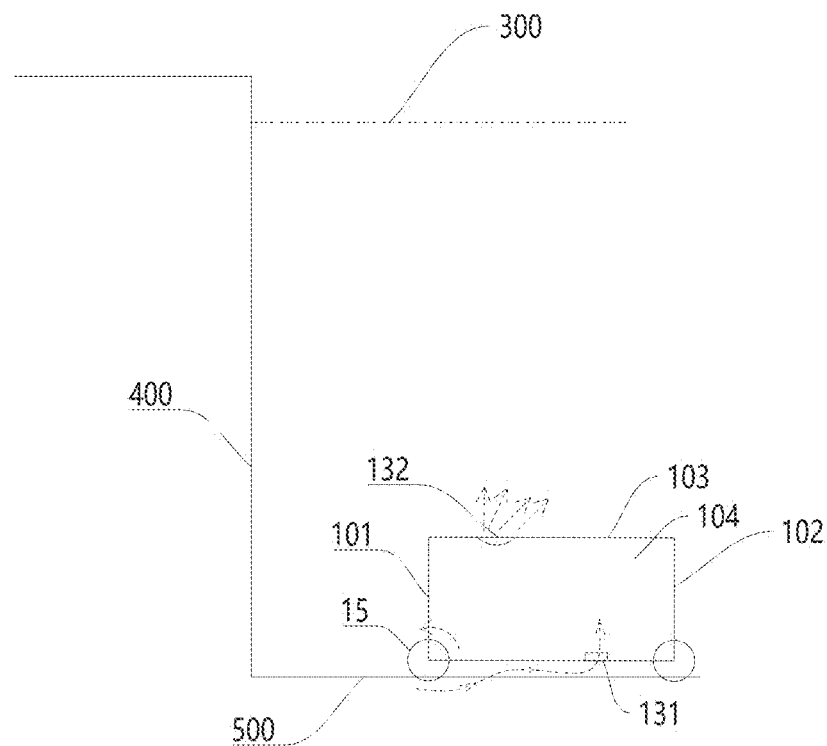
FIG. 3 is a schematic diagram of a state in which a front rolling brush of a swimming pool cleaning robot is not in contact with a pool wall according to an embodiment of this disclosure.

As shown in FIG. 3, it is a state in which the front rolling brush 15 is not in contact with the pool wall 400. In this embodiment, after the water absorbing assembly 11 sucks a water flow from the water inlet 131 at the bottom of the housing 103, the water flow is drained through the water outlet 132 at the top of the housing 103. The driving assembly 131 drives the front rolling brush 15 to rotate relative to the body 10, and the front rolling brush 15 mixes the water flow to a side of the water inlet 131. Garbage in the water, especially on the surface of the pool bottom 500, is rolled up by the front rolling brush 15, a negative pressure is generated at a position of the water inlet 131 due to the action of the water absorbing assembly 11, and a water discharge at the water outlet 132 is relatively large. With reference to FIG. 2, the garbage in the water enters the filter cavity 121 after passing through the water inlet 131 and the dust port 122, and impurities in the water are retained in the filter cavity 121 disposed at the rear, and a filtered water flow is drained through the water outlet. Because both the transmission assembly 14 and the driving assembly 131 described above are close to the front end 101 of the body 10, the filter cavity 121 has a large effective filtering area and is not easy to be blocked, and accommodation space of impurities is increased.

Figure 4:
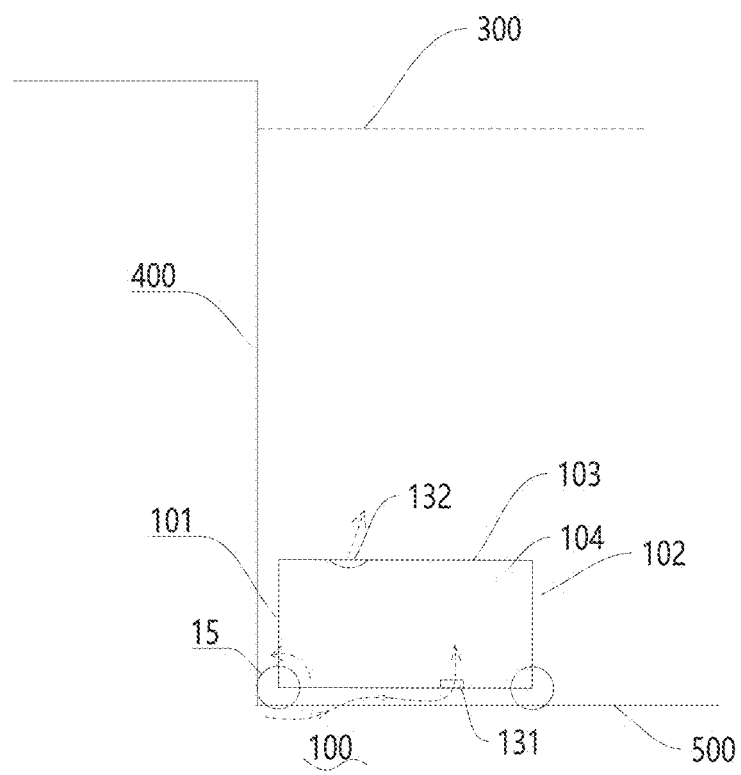
FIG. 4 is a schematic diagram of a state in which a front rolling brush of a swimming pool cleaning robot is in contact with a pool wall according to an embodiment of this disclosure.

As shown in FIG. 4, the front rolling brush 15 is in contact with the pool wall 400 and the pool bottom 500, that is, the front rolling brush 15 is in the first state 100 at this time. Different from the state shown in FIG. 3, in this case, a water discharge of the water absorbing assembly 11 is reduced, further, the negative pressure at the water inlet 131 is reduced. The front walking wheel 1302 and the front rolling brush 15 keep rotating, and further, the front rolling brush 15 may clean a boundary position between the pool wall 400 and the pool bottom 500, that is, an edge region of the pool bottom 500. In this state, there is a friction force between the front rolling brush 15 and the pool wall 400. When the driving assembly 131 drives the front rolling brush 15 to continue to move toward the pool wall 400 by using the rolling brush transmission group 142, it is convenient for the front rolling brush 15 to lift up relative to the pool bottom 500 and move along the pool wall 400 to the water line 300.

Figure 5:
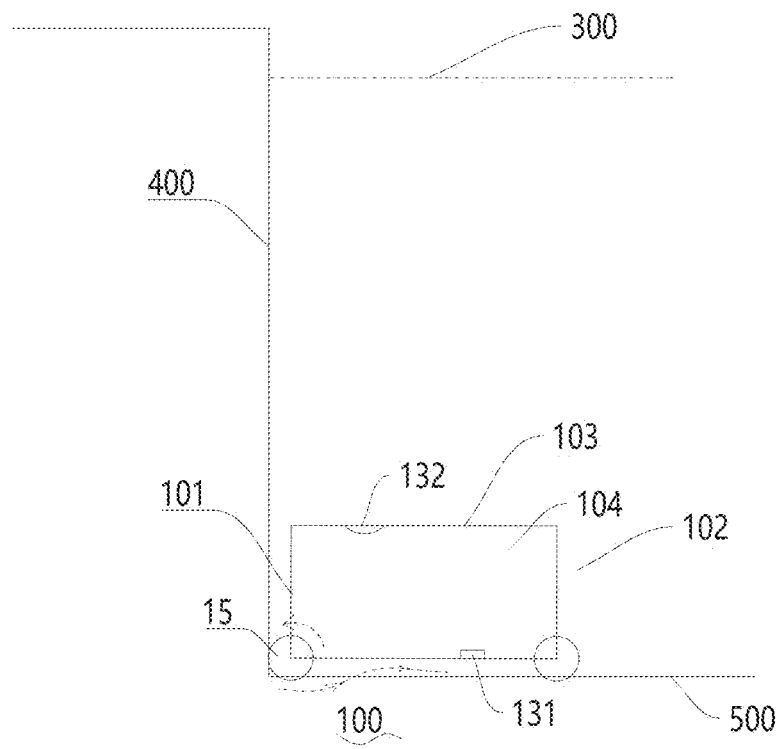
FIG. 5 is a schematic diagram of another state in which a front rolling brush of a swimming pool cleaning robot is in contact with a pool wall according to an embodiment of this disclosure.

As shown in FIG. 5, this state is different from the state shown in FIG. 4. In this case, the water absorbing assembly 11 is closed, that is, the water discharge of the water absorbing assembly 11 is zero. When the driving assembly 131 drives, by using the rolling brush transmission group 142, the front rolling brush 15 to continue to move in a direction of the pool wall 400, compared with the state of the water absorbing assembly 11 shown in FIG. 4, the swimming pool cleaning robot may more easily lift the front rolling brush 15 relative to the pool bottom 500. A person skilled in the art adjusts the operating state of the water absorbing assembly 11 as shown in FIG. 4 or FIG. 5 in the pool wall 400 cleaning mode for different situations of the swimming pool. For example, when there is a relatively large quantity of impurities at an edge position between the pool wall 400 and the pool bottom 500, a state of the water absorbing assembly 11 is enabled to be shown in FIG. 4. A water discharge is reduced, but the water discharge is not equal to zero. In another case, when faced with a complex shape of the pool wall 400, the swimming pool robot has difficulty in climbing the wall, the state of the water absorbing assembly 11 of the swimming pool cleaning robot is adjusted as shown in FIG. 5, and the water absorbing assembly 11 is turned off.

Figure 6:
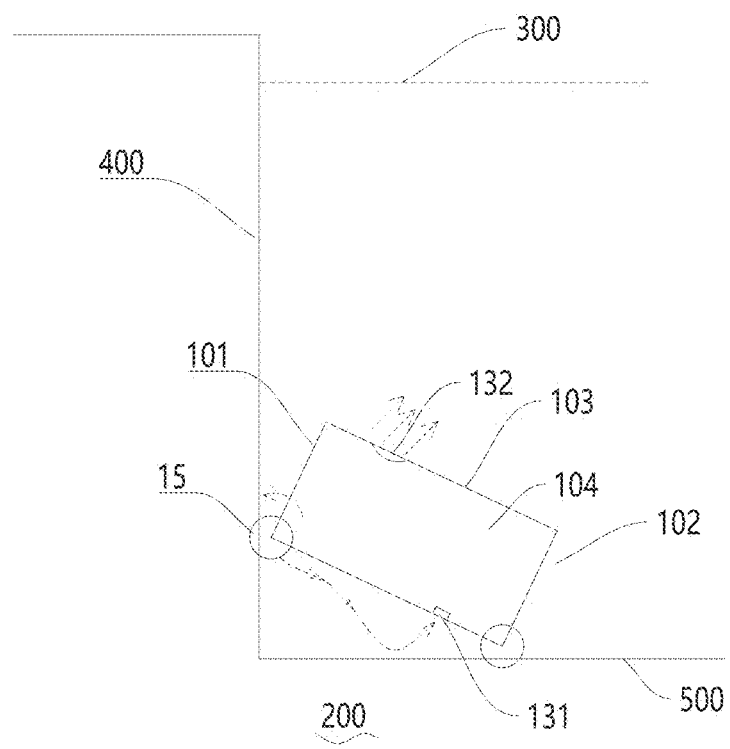
FIG. 6 is a schematic diagram of a state in which a front rolling brush of a swimming pool cleaning robot is in contact with only a pool wall according to an embodiment of this disclosure.

As shown in FIG. 6, this state is different from the state shown in FIG. 4 and FIG. 5. In this case, the front rolling brush 15 is in contact with only the pool wall 400, that is, the front rolling brush 15 is in the second state 200. In the state shown in FIG. 4 and FIG. 5, after the driving assembly 131 continues to drive the front rolling brush 15 to rotate, the front rolling brush 15 may be switched from the first state 100 to the second state 200. The front rolling brush 15 rotates relative to the pool wall 400 and mixes impurities on the pool wall 400 to move toward the position of the water inlet 131, thereby cleaning the pool wall 400.

Further, in an embodiment, the swimming pool cleaning robot further includes a water absorbing assembly 11. In the pool wall 400 cleaning mode, when the front rolling brush 15 abuts against only the pool wall 400, the water absorbing assembly 11 is started, or a water discharge of the water absorbing assembly 11 is increased.

In this embodiment, in the pool wall 400 cleaning mode, when the front rolling brush 15 abuts against only the pool wall 400, the water discharge of the water absorbing assembly 11 is increased, a suction force at the bottom of the entire robot is improved, a contact area between the front rolling brush 15 and the pool wall 400 is further increased, and a friction force between the front rolling brush 15 and the pool wall 400 is increased, thereby improving a cleaning effect of the front rolling brush 15 on the pool wall 400, improving stability of the body 10 moving on the pool wall 400, and preventing the robot from sliding from the pool wall 400 to the pool bottom 500.

Embodiment 2

A second aspect of the embodiments of this disclosure provides a swimming pool cleaning robot that is able to move in water to perform cleaning, and the swimming pool cleaning robot includes:
- a body 10, where along a forward direction of the robot, the body 10 has a front end 101 and a rear end 102, the body 10 has a housing 103 and an accommodating cavity 104, the housing 103 is provided with a water inlet 131 communicating with the accommodating cavity 104, and the water inlet 131 is disposed on a lower surface of the housing 103;
- a water absorbing assembly 11, where the water absorbing assembly 11 is configured to suck a water flow from the water inlet 131 into the accommodating cavity 104, and then drained to an outside of the housing 103;
- a walking assembly 13, where the walking assembly 13 includes a front walking wheel 1302, and the front walking wheel 1302 is rotatably disposed at the front end 101;
- a driving assembly 131, where the driving assembly 131 is close to the front end 101, the driving assembly 131 includes a driving motor 1301 and a first output gear 1312, the driving motor 1301 includes a motor rotation axis 1311, and the motor rotation axis 1311 is connected to the first output gear 1312;
- a front rolling brush 15, where the front rolling brush 15 is rotatably disposed at the front end 101, the front rolling brush 15 is configured to clean a to-be-cleaned surface, the rolling brush includes a first state 100 and a second state 200, in the first state 100, the front rolling brush 15 abuts against a pool wall 400 and a pool bottom 500, and in the second state 200, the front rolling brush 15 abuts against only the pool wall 400; and
- a transmission assembly 14, where the transmission assembly 14 includes at least a rolling brush transmission group 142; the first output gear 1312 is in transmission connection with the front rolling brush 15 by using the rolling brush transmission group 142; and
- the robot includes a pool wall 400 cleaning mode, and in the pool wall 400 cleaning mode, the body 10 moves to the pool wall 400, and a water discharge of the water absorbing assembly 11 is reduced, or the water absorbing assembly 11 is turned off, until the driving assembly 131 drives the front rolling brush 15 to switch from the first state 100 to the second state 200.

Different from Embodiment 1, in Embodiment 2, a function of the water absorbing assembly 11 is defined again. The water absorbing assembly 11 is only configured to suck a water flow from the water inlet 131 into the accommodating cavity 104, and then drained to an outside of the housing 103, and a technology related to the filter assembly 12 is not described. Refer to the previous embodiment or another prior art for the related technology. In this embodiment, there is not much description about the filter assembly 12. In this embodiment, for the description of the relevant state and function of the swimming pool cleaning robot in the pool wall 400 cleaning mode, refer to the foregoing embodiment, and only the beneficial effects of this embodiment compared with the prior art are briefly described below.

In this embodiment, compared with the prior art, both the driving assembly 131 and the front walking wheel 1302 are close to the front end 101 of the body 10. The front rolling brush 15 is in transmission connection with the first output gear 1312 by using the rolling brush transmission group 142. Through cooperation of defining positions of the front rolling brush 15, the driving motor 1301, and the front walking wheel 1302, and transmission connection between all components and the transmission assembly 14, all components at a position of the front end 101 of the body 10 are arranged compactly, space of the filter assembly 12 is increased, and mass at a position of the front rolling brush 15 may be increased. Through suction of the water absorbing assembly 11, in a process in which the water flow passes through the water inlet 131 and the accommodating cavity 104, and is drained, a negative pressure may be formed at the water inlet 131 of the swimming pool cleaning robot. In this way, in the pool wall 400 cleaning mode, after the body 10 moves to the pool wall 400, a water discharge of the water absorbing assembly 11 is reduced or closed, the negative pressure at the water inlet 131 can be reduced, and an absorption force of the swimming pool cleaning robot on the pool bottom 500 or the pool wall 400 may be reduced. Further, the swimming pool cleaning robot actively controls when the rolling brush is lifted relative to the pool bottom 500, effectively assists the front rolling brush 15 in switching from the first state 100 to the second state 200, increases the contact area between the front rolling brush 15 and the to-be-cleaned surface, thereby improving the cleaning effect of the swimming pool cleaning robot at the edge position of the pool bottom 500 when switching between the pool wall 400 and the pool bottom 500.

Embodiment 3

A third aspect of the embodiments of this disclosure provides a swimming pool cleaning robot, the swimming pool cleaning robot is able to move in water to perform cleaning, and the swimming pool cleaning robot includes:
- a body 10, where the body 10 has a front end 101 and a rear end 102, the body 10 is provided with a detection assembly 105, the detection assembly 105 is configured to detect environment information, the environment information includes wall surface information of the pool wall 400, in a horizontal direction, a length of the swimming pool cleaning robot is L1, and in a vertical direction, a width of the swimming pool cleaning robot is W1;
- a walking assembly 13, where the walking assembly 13 includes a front walking wheel 1302 disposed close to the front end 101;
- a driving assembly 131, where the driving assembly 131 is close to the front end 101, the driving assembly 131 includes a driving motor 1301 and a first output gear 1312, the driving motor 1301 includes a motor rotation axis 1311, and the motor rotation axis 1311 is connected to the first output gear 1312;
- a transmission assembly 14, where the transmission assembly 14 includes a rolling brush transmission group 142; and
- a front rolling brush 15, where the front rolling brush 15 is rotatably disposed at the front end 101, the front rolling brush 15 is configured to clean a to-be-cleaned surface, and the first output gear 1312 is in transmission connection with the front rolling brush 15 by using the rolling brush transmission group 142.

The swimming pool cleaning robot includes a pool wall 400 cleaning mode. In the pool wall 400 cleaning mode, the body 10 moves to the pool wall 400. In a case that the pool wall 400 is a first wall surface 16, and when the robot is unable to continue to move toward a water line 300 along the first wall surface 16, the front walking wheel 1302 and the front rolling brush 15 move to a side away from the first wall surface 16; and in a case that the pool wall 400 is a second wall surface 17, the front walking wheel 1302 and the front rolling brush 15 continue to move toward the water line 300 along the second wall surface 17, until the robot reaches the water line 300, where along the forward direction of the robot, the first wall surface 16 is a concave arc surface, the first wall surface 16 has an access opening 161, a maximum value of a vertical caliber of the access opening 161 is L2, a maximum value of a horizontal caliber of the access opening 161 is W2, L2>L1, W2>W1, and the second wall surface 17 is a vertical wall.

A difference between Embodiment 3 and Embodiment 2 is that, in Embodiment 3, impact of the water absorbing assembly 11 on a cleaning state of the swimming pool cleaning robot is not emphasized. Refer to Embodiment 1, Embodiment 2, or another prior art for the related technology. In this embodiment, there is not much description about the filter assembly 12 and the water absorbing assembly 11, but it is emphasized that the body 10 is provided with a detection assembly 105. Environment information in the swimming pool may be detected by using the detection assembly 105, where the environment information includes information about the pool wall 400. A cleaning mode of the swimming pool cleaning robot is detected and controlled by using the detection assembly 105, thereby implementing intelligent cleaning, and further reducing energy consumption.

As an example, the detection assembly 105 includes a distance sensor, an image acquisition sensor, a line laser, an IMU, an odometer, or the like disposed on the body 10. A movement attitude of the robot is detected by using the IMU, or a driving distance of the robot is detected by using the odometer, to determine a driving distance or a moving position of the swimming pool robot.

It should be further noted that, in this embodiment, the detection assembly 105 is configured to collect environment information in the swimming pool, and the swimming pool cleaning robot adjusts a motion mode and a cleaning mode of the body 10 by using the environment information collected by the detection assembly 105. In this embodiment, after the detection assembly 105 detects the environment information, both the driving motor 1301 and the front walking wheel 1302 are close to the front end 101 of the body 10, the front walking wheel 1302 is in transmission connection with the first output gear 1312 by using a walking wheel transmission group 141, and the front rolling brush 15 is in transmission connection with the first output gear 1312 by using the rolling brush transmission group 142.

Through cooperation of defining positions of the front rolling brush 15, the driving motor 1301, and the front walking wheel 1302, and transmission connection between all components and the transmission assembly 14, all components at a position of the front end 101 of the body 10 are arranged compactly, and compared with other positions of the swimming pool cleaning robot, mass at a position of the front rolling brush 15 may be increased.

Further, in the pool wall 400 cleaning mode, after the body 10 moves to the pool wall 400, and the pool wall 400 is the first wall surface 16, the robot is unable to continue to move toward the water line 300 along the first wall surface 16, and the front walking wheel 1302 and the front rolling brush 15 move to a side away from the first wall surface 16, to increase a contact area between the front rolling brush 15 and the pool wall 400. In this way, a boundary position between the first wall surface 16 and the pool bottom 500 may be cleaned, and energy consumption of the cleaning robot may be effectively reduced.

Further, in the pool wall 400 cleaning mode, after the body 10 moves to the pool wall 400, when the pool wall 400 is the second wall surface 17, that is, when the pool wall 400 is a vertical wall, a water discharge of the water absorbing assembly 11 is reduced or closed, so that an absorption force at the position of the water inlet 131 is reduced. Further, when the rolling brush is lifted relative to the pool bottom 500 is actively controlled, and a contact area between the front rolling brush 15 and the to-be-cleaned surface is increased during a process of assisting the front rolling brush 15 in switching from the first state 100 to the second state 200, thereby improving the cleaning effect of the swimming pool cleaning robot at the edge position of the pool bottom 500 when switching between the pool wall 400 and the pool bottom 500.

Different cleaning states for the first wall surface 16 and the second wall surface 17 in which the swimming pool cleaning robot is in the pool wall 400 cleaning mode in Embodiment 3 are described in detail below.

Figure 7:
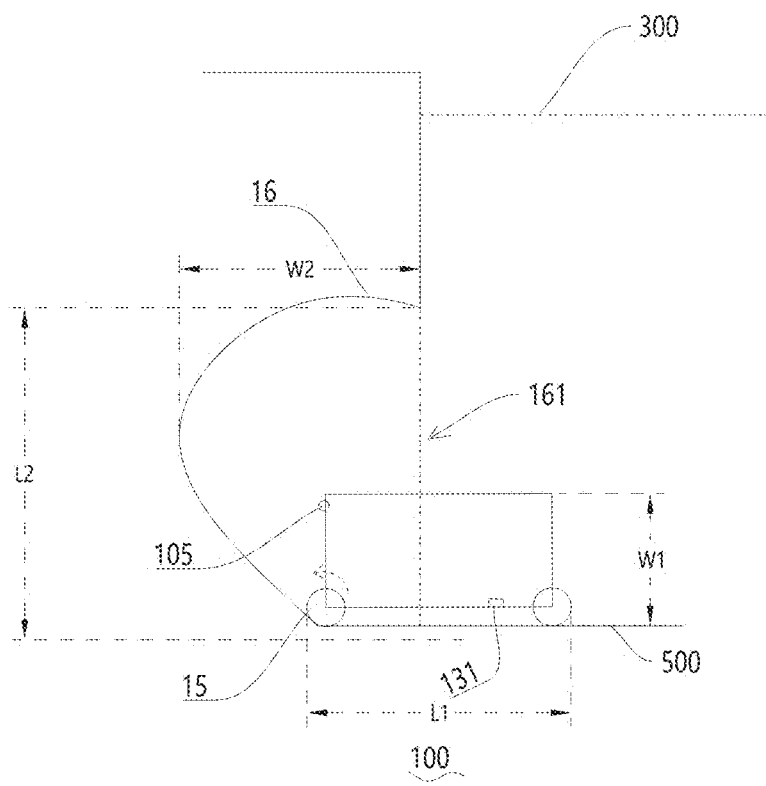
FIG. 7 is a schematic diagram of a state in which a front rolling brush of a swimming pool cleaning robot is in contact with a first wall surface and a pool bottom according to an embodiment of this disclosure.
Figure 8:
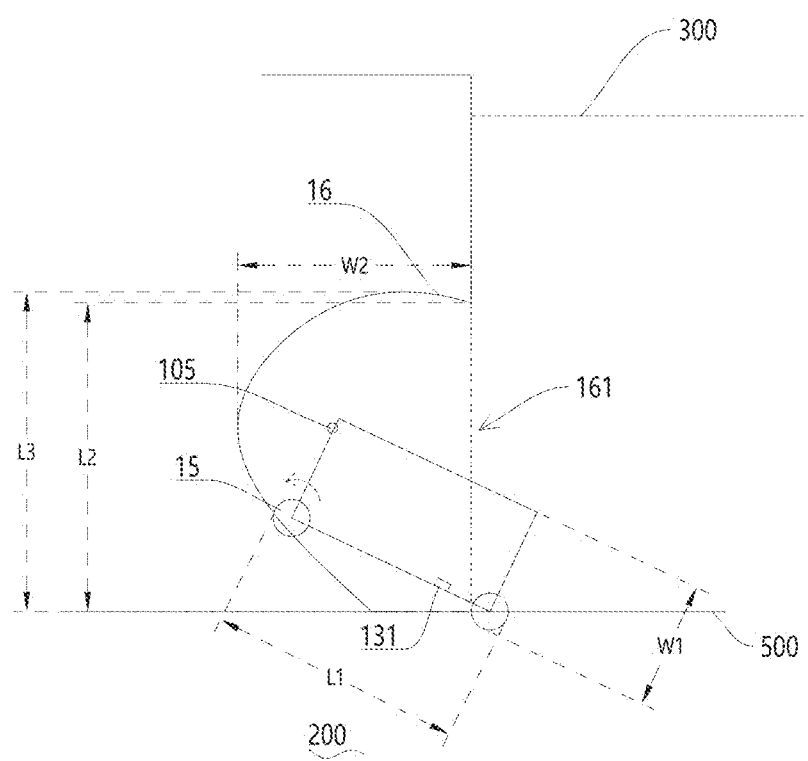
FIG. 8 is a schematic diagram of a state in which a front rolling brush of a swimming pool cleaning robot is in contact with only a first wall surface according to an embodiment of this disclosure.

As shown in FIG. 7, FIG. 7 is a schematic diagram of a state in which the front rolling brush 15 of the swimming pool cleaning device is in contact with both the first wall surface 16 and the pool bottom 500. The walking assembly 13 continues to drive the body 10 to move toward the first wall surface 16, and the front rolling brush 15 is in contact with the first wall surface 16. The detection assembly 105 detects information about the pool wall 400 in real time, for example, inclined angle information of the pool wall 400 relative to the pool bottom 500, or a movement distance of the body 10 in the pool wall 400. The front rolling brush 15 rotates at a boundary position between the pool bottom 500 and the first wall surface 16, and may clean the boundary position between the first wall surface 16 and the pool bottom 500 well when driven by friction force of the front rolling brush 15. When the front rolling brush 15 is rotated until the front rolling brush 15 is in contact with only the first wall surface 16, as shown in FIG. 8, the body 10 gradually moves from the access opening 161 formed by the first wall surface 16 to a concave arc region of the first wall surface 16. Because L2>L1 and W2>W1, in a state shown in FIG. 9, after moving for a movement distance along the first wall surface 16 to a position of the water line 300, the swimming pool cleaning robot cannot continue to move to the position of the water line 300, and the swimming pool cleaning robot moves to a side away from the first wall surface 16. As an example, the front rolling brush 15 moves along the first wall surface 16 in a vertical downward direction, and gradually moves until the front rolling brush 15 is completely in no contact with the first wall surface 16. In this way, even if the swimming pool cleaning robot needs to clean the first wall surface 16 in the pool wall 400 cleaning mode, it can ensure that at least part of the first wall surface 16 and the boundary position between the first wall surface 16 and the pool bottom 500 can be well cleaned.

Further, according to the swimming pool cleaning device provided in this embodiment of this disclosure, in a vertical direction, the first wall surface 16 has a top, the top is located on an inside of the access opening 161, and a distance between the top and a horizontal plane on which the pool bottom 500 is located is L3, where L3>L2.

In this embodiment, when L3>L2, the swimming pool cleaning robot cannot clean an arc surface between the top of the first wall surface 16 and the top of the access opening 161, and the front walking wheel 1302 and the front rolling brush 15 move to the side away from the first wall surface 16.

According to the swimming pool cleaning device provided in this embodiment of this disclosure, along a vertical upward direction, a curvature of the first wall surface 16 gradually increases.

In this embodiment, because the curvature of the first wall surface 16 gradually increases, and the front rolling brush 15 gradually gets away from the first wall surface 16, the friction force between the front rolling brush 15 and the first wall surface 16 decreases. After recognizing a state of the first pool wall 400, the detection assembly 105 may control the front walking wheel 1302 and the front rolling brush 15 to move to the side away from the first wall surface 16.

Figure 9:
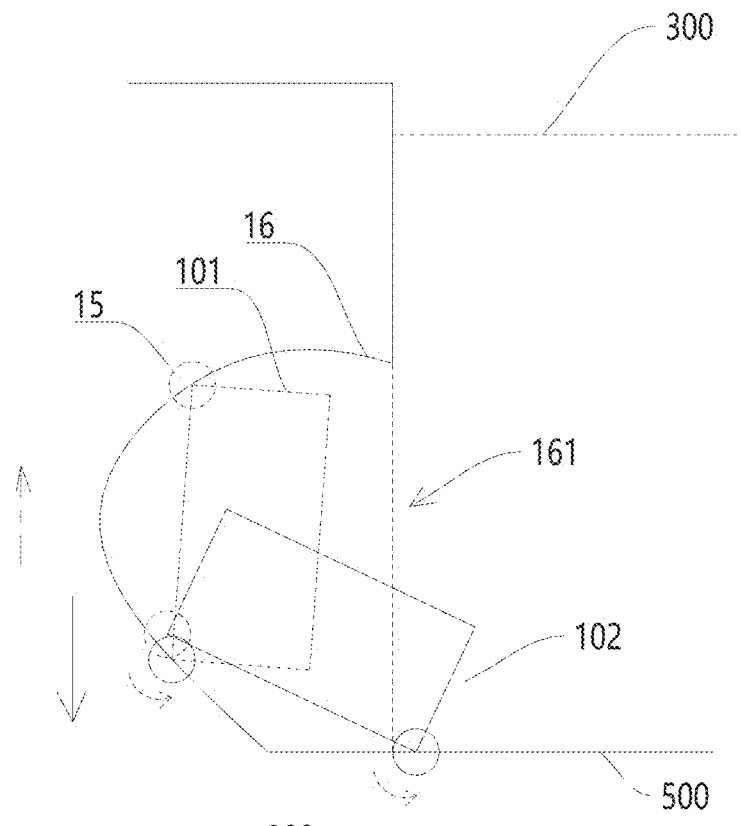
FIG. 9 is a schematic diagram of a state in which a swimming pool cleaning robot slides down along a first wall surface in FIG. 11 according to an embodiment of this disclosure.
Figure 10:
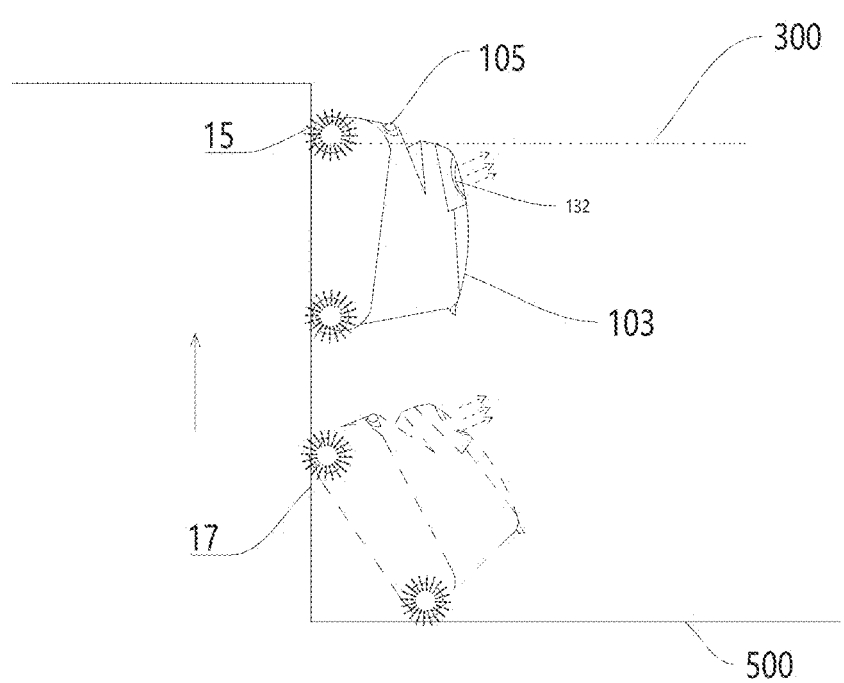
FIG. 10 is a schematic diagram of a state in which a front rolling brush of a swimming pool cleaning robot is in contact with only a second wall surface and moves to a position of a water line according to an embodiment of this disclosure.

As shown in FIG. 10, different from the cleaning state shown in FIG. 7 to FIG. 9, in this case, the pool wall 400 is the second wall surface 17, and the second wall surface 17 is a vertical wall. The front rolling brush 15 is in contact with the second wall surface 17, and the driving assembly 131 drives the front rolling brush 15 to gradually move from the pool bottom 500 along the second wall surface 17 to the water line 300, to clean the second wall surface 17.

Embodiment 4

A fourth aspect of the embodiments of this disclosure provides a swimming pool cleaning robot, the swimming pool cleaning robot is able to move in water to perform cleaning, and the swimming pool cleaning robot includes:
  a body 10, where along a forward direction of the robot, the body 10 has a front end 101 and a rear end 102;
  a walking assembly 13, where the walking assembly 13 includes a front walking wheel 1302 close to the front end 101;
  a driving assembly 131, where the driving assembly 131 is close to the front end 101, the driving assembly 131 includes a driving motor 1301 and a first output gear 1312, the driving motor 1301 includes a motor rotation axis 1311, and the motor rotation axis 1311 is connected to the first output gear 1312;
  in a vertical direction, a rotation axis of the front walking wheel 1302 is located in a first plane 18, a bottom of the front walking wheel 1302 is located in a second plane 19, and a rotation axis of the first output gear 1312 is located between the first plane 18 and the second plane 19;
  a transmission assembly 14, where the transmission assembly 14 includes a walking wheel transmission group 141; and
  a front rolling brush 15, where the front rolling brush 15 is rotatably disposed at the front end 101 and is configured to clean a to-be-cleaned surface, the first output gear 1312 is in transmission connection with the front rolling brush 15 by using the rolling brush transmission group 142, and connection lines between a rotation center of the first output gear 1312, a rotation center of the front walking wheel 1302, and a rotation center of the front rolling brush 15 form three angles, where an angle using the rotation center of the front walking wheel 1302 as a vertex is a first angle β, and β<150°.

A difference between Embodiment 4 and Embodiment 1 is that in Embodiment 4, impact of the water absorbing assembly 11 and the filter assembly 12 on the swimming pool cleaning robot is not emphasized. Refer to Embodiment 1 or another prior art for the related technology. In this embodiment, there is not much description about the filter assembly 12 and the water absorbing assembly 11. In this embodiment, for the description of the relevant state and function of the swimming pool cleaning robot in the pool wall 400 cleaning mode, refer to the foregoing embodiment, and only the beneficial effects of this embodiment compared with the prior art are briefly described below.

Figure 11:
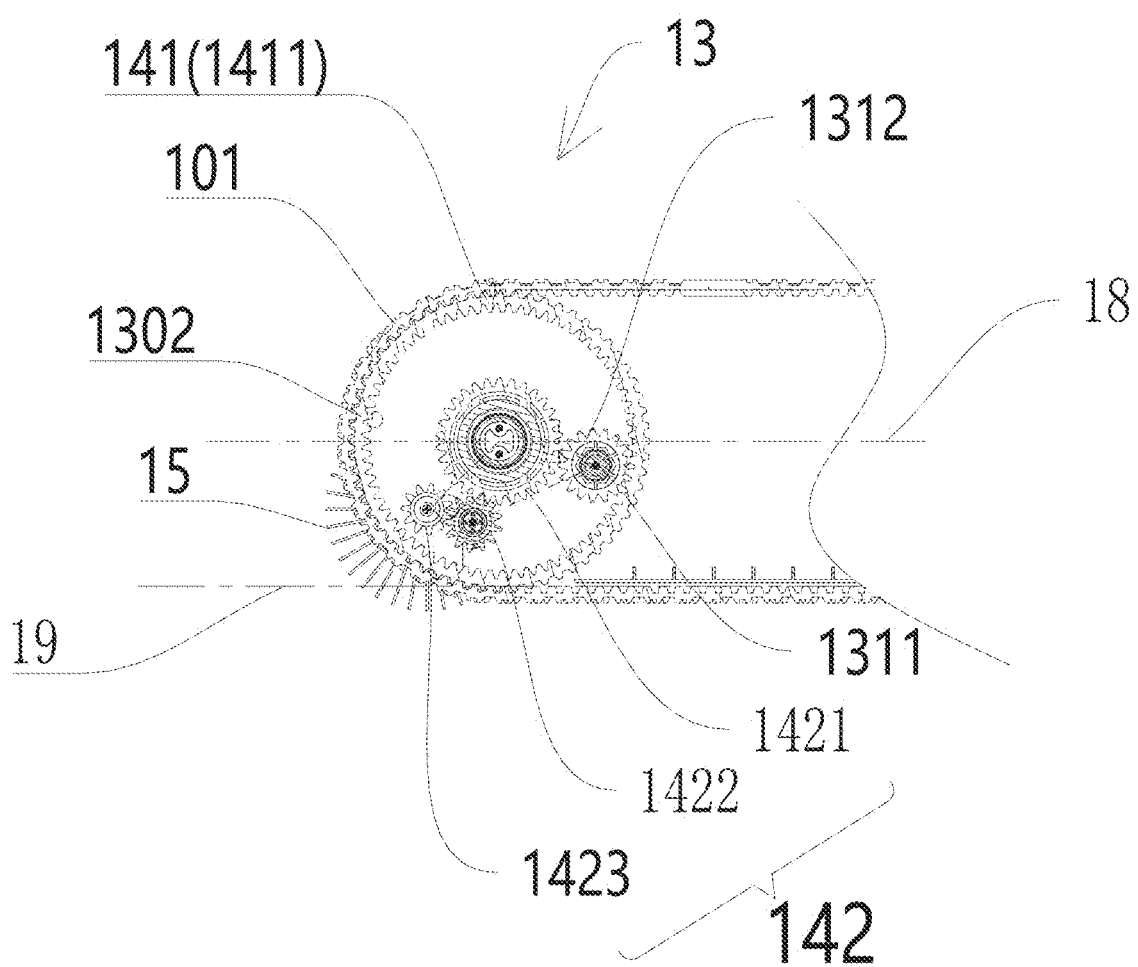
FIG. 11 is a schematic diagram of a partial state in which a first output gear is in transmission connection with a transmission assembly according to an embodiment of this disclosure.
Figure 12:
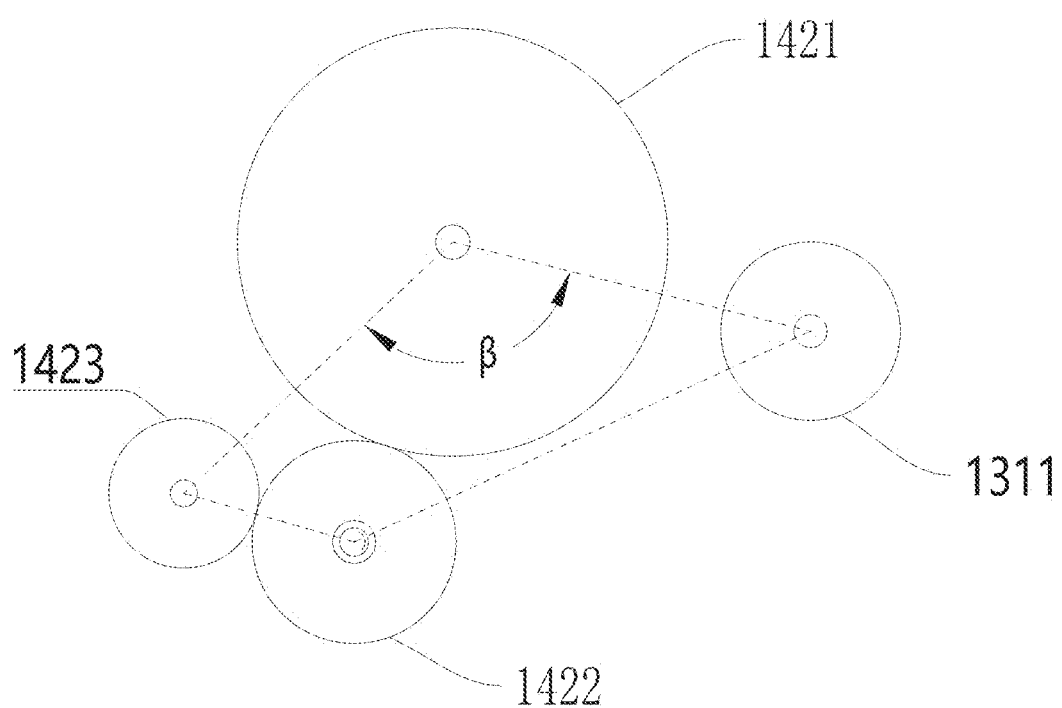
FIG. 12 is a schematic diagram of a simplified state in which a first output gear is in transmission connection with a transmission assembly shown in FIG. 11 according to an embodiment of this disclosure.

As shown in FIG. 11 and FIG. 12, it should be further noted that, in this embodiment, both the driving motor 1301 and the front walking wheel 1302 are close to the front end 101 of the body 10. The front walking wheel 1302 is in transmission connection with the first output gear 1312 by using the walking wheel transmission group 141. The front rolling brush 15 is in transmission connection with the first output gear 1312 by using the rolling brush transmission group 142, so that the first angle β<150°. Further, the front rolling brush 15, the driving motor 1301, the front walking wheel 1302, and the first output gear 1312 are concentrated at the front end 101 of the body 10 and are close to the bottom of the body 10, so that all components at the position of the front rolling brush 15 and the front end 101 of the body 10 are arranged more compactly. In this arrangement, when the robot is in a pool bottom 500 cleaning mode or the pool wall 400 cleaning mode, the front rolling brush 15 can be effectively prevented from lifting relative to the pool bottom 500 under unexpected circumstances, which is helpful to increase the contact area between the front rolling brush 15 and the to-be-cleaned surface, and improve the cleaning effect of the swimming pool cleaning robot at the edge position of the pool bottom 500 when switching between the pool wall 400 and the pool bottom 500.

The following further describes some structural components. These structural components may be selectively used in Embodiment 1, Embodiment 2, Embodiment 3, and Embodiment 4. Through the arrangement of these structural components, the cleaning effect of the swimming pool cleaning robot described in Embodiment 1, Embodiment 2, Embodiment 3, and Embodiment 4 may be improved.

According to the swimming pool cleaning device provided in this embodiment of this disclosure, the swimming pool cleaning robot further includes a water absorbing assembly 11. In the pool wall 400 cleaning mode, when the front rolling brush 15 abuts against only the pool wall 400, the water absorbing assembly 11 is started, or a water discharge of the water absorbing assembly 11 is increased.

In this embodiment, in the pool wall 400 cleaning mode, when the front rolling brush 15 abuts against only the pool wall 400, the water discharge of the water absorbing assembly 11 is increased, a suction force at the bottom of the entire robot is improved, a contact area between the front rolling brush 15 and the pool wall 400 is further increased, and a friction force between the front rolling brush 15 and the pool wall 400 is increased, thereby improving a cleaning effect of the front rolling brush 15 on the pool wall 400, improving stability of the body 10 moving on the pool wall 400, and preventing the robot from sliding from the pool wall 400 to the pool bottom 500.

According to the swimming pool cleaning device provided in this embodiment of this disclosure, the transmission assembly 14 further includes a walking wheel transmission group 141, the first output gear 1312 is in transmission connection with the front walking wheel 1302 by using the walking wheel transmission group 141, the rolling brush transmission group 142 includes an internal gear 1411, the first output gear 1312 is located on an inside of the front walking wheel 1302, the internal gear 1411 is disposed on an inner wall of the front walking wheel 1302, and the first output gear 1312 is in meshing transmission with the internal gear 1411.

As shown in the figure, it should be further noted that the first output gear 1312 is located on the inside of the front walking wheel 1302 and is in meshing transmission with the internal gear 1411 to drive the front walking wheel 1302 to rotate relative to the body 10, drive the body 10 to move relatively, and may further limit the position of the first output gear 1312, so that the driving motor 1301 and the first output gear 1312 are further concentrated on a side of the front walking wheel 1302, and a spatial integration effect of the front end 101 of the body 10 is improved.

According to the swimming pool cleaning device provided in this embodiment of this disclosure, the rolling brush transmission group 142 includes a first external gear 1421, a second external gear 1422, and a rolling brush transmission gear 1423, the first external gear 1421 is disposed on the inside of the front walking wheel 1302 and rotates coaxially with the front walking wheel 1302 in a same direction, an outer diameter of the first external gear 1421 is smaller than an inner diameter of the internal gear 1411, the rolling brush transmission gear 1423 is disposed on a rotation axis of the front rolling brush 15, the second external gear 1422 is disposed between the first external gear 1421 and the rolling brush transmission gear 1423, and the second external gear 1422 is in meshing transmission with the first external gear 1421 and the rolling brush transmission gear 1423.

It should be further noted that, the first external gear 1421, the second external gear 1422, and the rolling brush transmission gear 1423 are concentrated at the front end 101 of the body 10, so that a rotation direction of the first output gear 1312 is the same as a rotation direction of the front rolling brush 15 and the front walking wheel 1302, that is, the first output gear 1312, the front rolling brush 15, and the front walking wheel 1302 simultaneously rotate clockwise or simultaneously rotate anticlockwise, thereby facilitating control on the rotation direction of the front rolling brush 15, and facilitating the robot to calculate the rotation direction of the front walking wheel 1302, to measure a mileage of the robot.

As shown in FIG. 2 and FIG. 11, according to the swimming pool cleaning device provided in this embodiment of this disclosure, in a vertical direction, a rotation center of the front walking wheel 1302 is located in the first plane 18, a bottom of the front walking wheel 1302 is located in the second plane 19, the rotation center of the front walking wheel 1302, a rotation center of the second external gear 1422, and a rotation center of the rolling brush transmission gear 1423 are all located between the first plane 18 and the second plane 19, and a rotation center of the first output gear 1312 is located in the first plane 18, or the rotation center of the first output gear 1312 is located between the first plane 18 and the second plane 19.

It should be further noted that, the front walking wheel 1302, the second external gear 1422, the first output gear 1312, and the rolling brush transmission gear 1423 are enabled to close to the second plane 19, to further improve stability at a position at which the front end 101 of the body 10 is close to the bottom, and further raise the front rolling brush 15.

According to the swimming pool cleaning device provided in this embodiment of this disclosure, in a vertical direction, a rotation center of the front walking wheel 1302 is located in the first plane 18, a bottom of the front walking wheel 1302 is located in the second plane 19, the rotation center of the front walking wheel 1302, a rotation center of the second external gear 1422, and a rotation center of the rolling brush transmission gear 1423 are all located between the first plane 18 and the second plane 19, and along a vertical upward direction, a rotation axis of the first output gear 1312 is located above the first plane 18.

Figure 13:
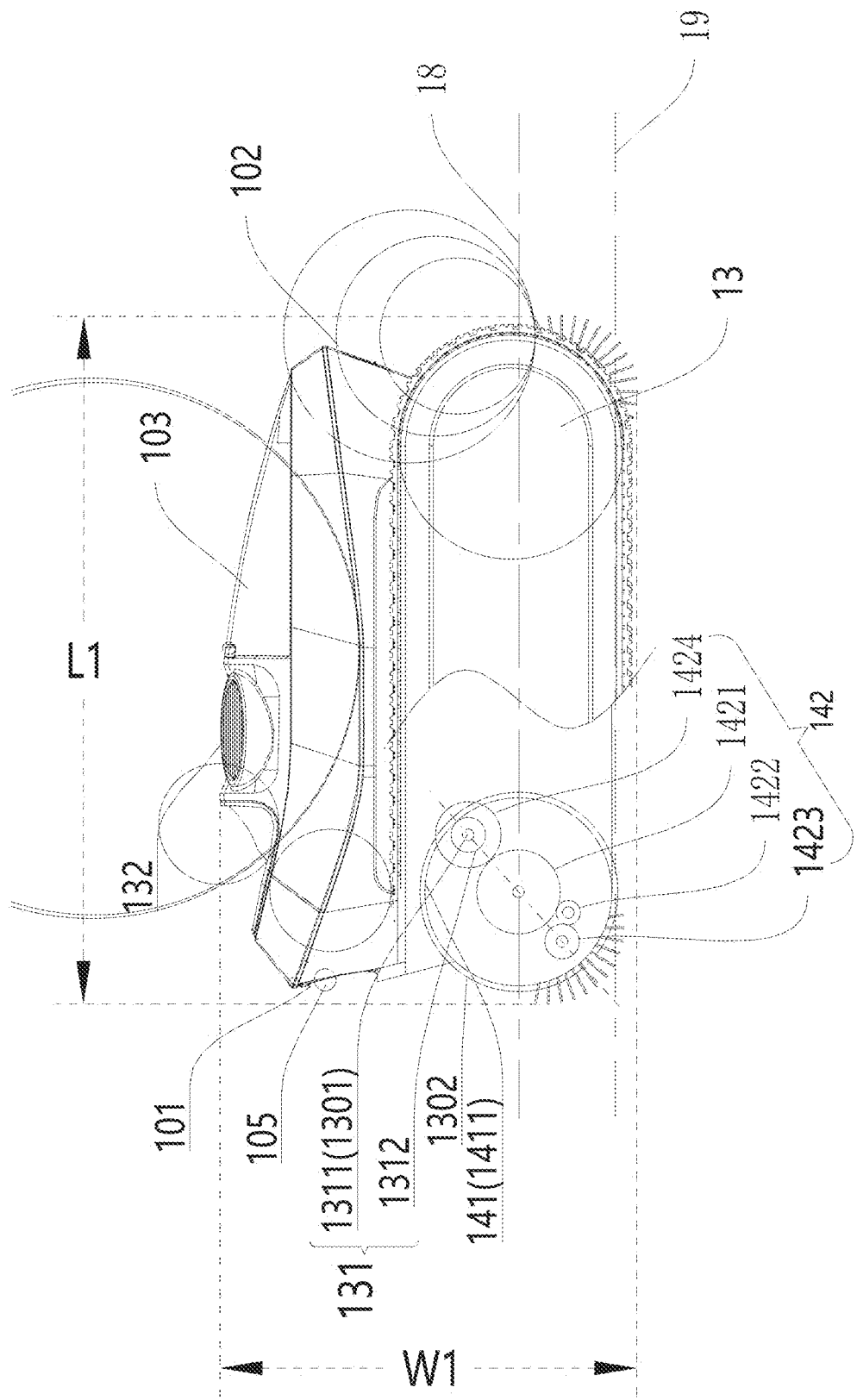
FIG. 13 is a schematic diagram of another state in which a first output gear is in transmission connection with a transmission assembly of a swimming pool cleaning robot according to an embodiment of this disclosure.

As shown in FIG. 13, it should be further noted that, in this embodiment, the front walking wheel 1302, the second external gear 1422, and the rolling brush transmission gear 1423 are close to the second plane 19, so that the first output gear 1312 is located above the first plane 18 and is in transmission connection with the internal gear 1411, and the first output gear 1312, the front rolling brush 15, and the front walking wheel 1302 simultaneously rotate clockwise or simultaneously rotate anticlockwise, thereby facilitating control on the rotation direction of the front rolling brush 15, and facilitating the robot to calculate the rotation direction of the front walking wheel 1302, to measure a mileage of the robot.

According to the swimming pool cleaning device provided in this embodiment of this disclosure, the first external gear 1421 is integrally formed with the front walking wheel 1302.

It should be further noted that, in this embodiment, the inner wall of the front walking wheel 1302 is provided with the internal gear 1411, and the rotation center of the front walking wheel 1302 is provided with the first external gear 1421 and is in transmission connection with the internal gear 1411 by using the first external gear 1421. After the first output gear 1312 drives the internal gear 1411 to rotate, synchronous rotation of the first external gear 1421 and the front walking wheel 1302 can be implemented, thereby improving stability of the transmission assembly 14 in a transmission process.

According to the swimming pool cleaning device provided in this embodiment of this disclosure, the first external gear 1421 is detachably connected to the front walking wheel 1302, the rolling brush transmission group 142 further includes a second output gear 1424, the second output gear 1424 and the first output gear 1312 are disposed on the motor rotation axis 1311 at an interval along an axial direction of the rotation axis of the driving motor 1301, the first output gear 1312 and the second output gear 1424 rotate in a same direction, and the second output gear 1424 is in transmission connection with the first external gear 1421.

As shown in FIG. 13, it should be further noted that, in this embodiment, the front walking wheel 1302 is detachably connected to the first external gear 1421. When the front walking wheel 1302 needs to be maintained, the first external gear 1421 does not need to be separated, thereby improving convenience during maintenance of the walking assembly 13. The second output gear 1424 is in transmission connection with the first external gear 1421, so that the first output gear 1312, the front rolling brush 15, and the front walking wheel 1302 simultaneously rotate clockwise or simultaneously rotate anticlockwise, thereby facilitating control on the rotation direction of the front rolling brush 15, and facilitating the robot to calculate the rotation direction of the front walking wheel 1302, to measure a mileage of the robot.

In this embodiment, the swimming pool cleaning device includes a body 10, a water absorbing assembly 11, a filter assembly 12, a walking assembly 13, a transmission assembly 14, and a front rolling brush 15. The walking assembly 13 includes a front walking wheel 1302, a driving assembly 131 and the front walking wheel 1302 are disposed close to a front end 101 of the body 10, and the front rolling brush 15 includes a first state 100 and a second state 200. In the pool wall 400 cleaning mode of the robot, when the body 10 moves to the pool wall 400, a water discharge of the water absorbing assembly 11 is reduced or closed, until the walking assembly 13 drives the front rolling brush 15 to switch from the first state 100 to the second state 200. Compared with the prior art, the swimming pool cleaning device provided in this disclosure can improve effective filtering space of the filter assembly 12, and prevent the front rolling brush 15 from pulling a wheelie before meeting the pool wall 400. When the swimming pool cleaning robot switches from the pool bottom 500 to the pool wall 400, the contact area between the front rolling brush 15 and the to-be-cleaned surface is increased, thereby improving an overall cleaning effect of the swimming pool cleaning robot.

Each embodiment or implementation of this specification is described in a progressive manner, each embodiment focuses on the difference from other embodiments, and the same and similar parts between the embodiments may refer to each other.

In the descriptions of this disclosure, it should be understood that an orientation or positional relationship indicated by the term "center", "longitudinal", "transverse", "length", "width", "thickness", "above", "beneath", "front", "back", "left", "right", "vertical", "horizontal", "top", "bottom", "internal", "external", or the like is based on an orientation or positional relationship shown in the accompanying drawings, and is merely for ease of describing this disclosure and simplifying description, but does not indicate or imply that an apparatus or an element referred to needs to have a specific orientation or be constructed and operated in a specific orientation, and therefore cannot be understood as a limitation on this disclosure.

In the descriptions of this disclosure, it should be understood that terms "include", "have" and any other variants used in this specification are intended to cover non-exclusive inclusion, for example, a process, method, system, product, or device that includes a list of steps or units is not necessarily limited to those expressly listed steps or units, but may include other steps or units not expressly listed or inherent to such a process, method, product, or device.

Unless specifically defined and limited otherwise, terms "installed", "linked", "connected", "fixed", and the like should be understood in a broad sense, for example, it may be a fixed connection, a detachable connection, or a whole; it may be a direct link or an indirect link through an intermediary, and it may be an internal connection between two elements or an interaction relationship between two elements. A person of ordinary skill in the art may understand the specific meanings of the foregoing terms in this disclosure according to specific situations. Moreover, the terms such as "first" and "second" are used only for the purpose of description and cannot be understood as indicating or implying relative importance or implicitly indicating the number of technical features denoted.

Finally, it should be noted that: the foregoing embodiments are merely used for describing the technical solutions of this disclosure, but are not intended to limit this disclosure. Although this disclosure is described in detail with reference to the foregoing embodiments, it should be appreciated by a person of ordinary skill in the art that, modifications may still be made to the technical solutions described in the foregoing embodiments, or equivalent replacements may be made to the part or all of the technical features; and these modifications or replacements will not cause the essence of corresponding technical solutions to depart from the scope of the technical solutions in the embodiments of this disclosure.

What is claimed is:

1. A swimming pool cleaning robot, wherein the swimming pool cleaning robot is able to move in water to perform cleaning, and the swimming pool cleaning robot comprises:
a body, wherein along a forward direction of the swimming pool cleaning robot, the body has a front end and a rear end, the body has a housing and an accommodating cavity, the housing is provided with a water inlet communicating with the accommodating cavity, and the water inlet is disposed on a lower surface of the housing;
a detection assembly is arranged on the body and is configured to detect environment information, which comprises wall surface information of the pool wall, and the detection assembly comprises one of a distance sensor, an image acquisition sensor, a line laser, an IMU, an odometer;
a water absorbing assembly, wherein the water absorbing assembly is configured to suck a water flow from the water inlet into the accommodating cavity and then drained to an outside of the housing;
a walking assembly, wherein the walking assembly comprises a front walking wheel, and the front walking wheel is rotatably disposed at the front end;
a driving assembly, wherein the driving assembly is close to the front end, the driving assembly comprises a driving motor and a first output gear, the driving motor comprises a motor rotation axis, and the motor rotation axis is connected to the first output gear;
a front rolling brush, wherein the front rolling brush is rotatably disposed at the front end, the front rolling brush is configured to clean a to-be-cleaned surface, the front rolling brush comprises a first state and a second state, in the first state, the front rolling brush abuts against a pool wall and a pool bottom, and in the second state, the front rolling brush abuts against only the pool wall; and
a transmission assembly, wherein the transmission assembly comprises at least a rolling brush transmission group; the first output gear is in transmission connection with the front rolling brush by using the rolling brush transmission group; and
the robot comprises a pool wall cleaning mode, and in the pool wall cleaning mode, the body moves to the pool wall, and a water discharge of the water absorbing assembly is reduced, or the water absorbing assembly is turned off, until the driving assembly drives the front rolling brush to switch from the first state to the second state, in a case that the pool wall is a first wall surface, and when the swimming pool cleaning robot is unable to continue to move toward a water line along the first wall surface, the front walking wheel and the front rolling brush move to a side away from the first wall surface; and in a case that the pool wall is a second wall surface, the front walking wheel and the front rolling brush continue to move toward the water line along the second wall surface, until the swimming pool cleaning robot reaches the water line, wherein along the forward direction of the swimming pool cleaning robot, the first wall surface is a concave arc surface, the second wall surface is a vertical wall.

2. The swimming pool cleaning robot according to claim 1, wherein
in a horizontal direction, a length of the swimming pool cleaning robot is L1, and in a vertical direction, a width of the swimming pool cleaning robot is W1; and
the first wall surface has an access opening, a maximum value of a vertical caliber of the access opening is L2, a maximum value of a horizontal caliber of the access opening is W2, L2>L1, W2>W1;
in the first state, the front rolling brush abuts against a pool wall and a pool bottom, the front rolling brush rotates at a boundary position between the pool bottom and the first wall surface, and may clean the boundary position between the first wall surface and the pool bottom well when driven by friction force of the front rolling brush;
in the second state, the front rolling brush abuts against only the pool wall, the body gradually moves from the access opening formed by the first wall surface to a concave arc region of the first wall surface, when the front rolling brush moves along the first wall surface to the water line and cannot continue to move to the water line, and the swimming pool cleaning robot moves to a side away from the first wall surface, and the front rolling brush moves along the first wall surface in a vertical downward direction, and gradually moves until the front rolling brush is completely in no contact with the first wall surface, the front rolling brush may clean at least part of the first wall surface and the boundary position between the first wall surface and the pool bottom.

3. The swimming pool cleaning robot according to claim 1, wherein
in a vertical direction, a rotation axis of the front walking wheel is located in a first plane, a bottom of the front walking wheel is located in a second plane, and a rotation axis of the first output gear is located between the first plane and the second plane; and
connection lines between a rotation center of the first output gear, a rotation center of the front walking wheel, and a rotation center of the front rolling brush form three angles, wherein an angle using the rotation center of the front walking wheel as a vertex is a first angle $\beta$, and $\beta<150°$.

4. The swimming pool cleaning robot according to claim 1, wherein in the pool wall cleaning mode, when the front rolling brush abuts against only the pool wall, the water absorbing assembly is started, or the water discharge of the water absorbing assembly is increased.

5. The swimming pool cleaning robot according to claim 1, wherein the transmission assembly further comprises a walking wheel transmission group, the first output gear is in transmission connection with the front walking wheel by using the walking wheel transmission group, the rolling brush transmission group comprises an internal gear, the first output gear is located on an inside of the front walking wheel, the internal gear is disposed on an inner wall of the front walking wheel, and the first output gear is in meshing transmission with the internal gear.

6. The swimming pool cleaning robot according to claim 5, wherein the rolling brush transmission group comprises a first external gear, a second external gear, and a rolling brush transmission gear, the first external gear is disposed on the inside of the front walking wheel and rotates coaxially with the front walking wheel in a same direction, an outer diameter of the first external gear is smaller than an inner diameter of the internal gear, the rolling brush transmission gear is disposed on a rotation axis of the front rolling brush, the second external gear is disposed between the first external gear and the rolling brush transmission gear, and the second external gear is in meshing transmission with the first external gear and the rolling brush transmission gear.

7. The swimming pool cleaning robot according to claim 6, wherein in a vertical direction, a rotation center of the front walking wheel is located in the first plane, a bottom of the front walking wheel is located in the second plane, the rotation center of the front walking wheel, a rotation center of the second external gear, and a rotation center of the rolling brush transmission gear are all located between the first plane and the second plane, and a rotation center of the first output gear is located in the first plane, or the rotation center of the first output gear is located between the first plane and the second plane.

8. The swimming pool cleaning robot according to claim 6, wherein in a vertical direction, a rotation center of the front walking wheel is located in a first plane, a bottom of the front walking wheel is located in a second plane, the rotation center of the front walking wheel, a rotation center of the second external gear, and a rotation center of the rolling brush transmission gear are all located between the first plane and the second plane, and along a vertical upward direction, a rotation axis of the first output gear is located above the first plane.

9. The swimming pool cleaning robot according to claim 6, wherein the first external gear is integrally formed with the front walking wheel.

10. The swimming pool cleaning robot according to claim 6, wherein the first external gear is detachably connected to the front walking wheel, the rolling brush transmission group in the transmission assembly further comprises a second output gear, the second output gear and the first output gear are disposed on the motor rotation axis at an interval along an axial direction of the rotation axis of the driving motor, the first output gear and the second output gear rotate in a same direction, and the second output gear is in transmission connection with the first external gear.

11. The swimming pool cleaning robot according to claim 1, wherein the detection assembly detects a relative position information between the body and the pool wall, so as to dynamically adjust the water discharge of the water absorbing assembly.

12. The swimming pool cleaning robot according to claim 1, wherein in the pool wall cleaning mode, the detection assembly may detect at least a relative position information between the body and the pool wall, the body moves to the pool wall, in a case that the pool wall is the first path, and the swimming pool cleaning robot is unable to continue to move toward the water line along the first path, or before the swimming pool cleaning robot reaches the water line, the front walking wheel and the front rolling brush move to a side away from the pool wall; and in a case that the pool wall is a second path, the front walking wheel and the front rolling brush continue to move toward the water line along the second path, until the swimming pool cleaning robot reaches the water line, wherein along the forward direction of the swimming pool cleaning robot, the first path is a concave arc surface, the first path has an access opening, a maximum value of a vertical caliber of the access opening is L2, a maximum value of a horizontal caliber of the access opening is W2, L2>L1, W2>W1, and the second path is a vertical path.

13. A swimming pool cleaning robot, wherein the swimming pool cleaning robot is able to move in water to perform cleaning, and the swimming pool cleaning robot comprises:
a body, wherein along a forward direction of the swimming pool cleaning robot, the body has a front end and a rear end, the body has a housing and an accommodating cavity, the housing is provided with a water inlet communicating with the accommodating cavity, and the water inlet is disposed on a lower surface of the housing;
a detection assembly is arranged on the body and is configured to detect environment information, which comprises wall surface information of the pool wall, and the detection assembly comprises one of a distance sensor, an image acquisition sensor, a line laser, an IMU, an odometer;
a water absorbing assembly, wherein the water absorbing assembly is configured to suck a water flow from the water inlet into the accommodating cavity and then drained to an outside of the housing;
a walking assembly, wherein the walking assembly comprises a front walking wheel, and the front walking wheel is rotatably disposed at the front end;
a driving assembly, wherein the driving assembly is close to the front end, the driving assembly comprises a driving motor and a first output gear, the driving motor comprises a motor rotation axis, and the motor rotation axis is connected to the first output gear;
a front rolling brush, wherein the front rolling brush is rotatably disposed at the front end, the front rolling brush is configured to clean a to-be-cleaned surface, the front rolling brush comprises a first state and a second state, in the first state, the front rolling brush abuts against a pool wall and a pool bottom, and in the second state, the front rolling brush abuts against only the pool wall; and
a transmission assembly, wherein the transmission assembly comprises at least a rolling brush transmission group; the first output gear is in transmission connection with the front rolling brush by using the rolling brush transmission group; and
the robot comprises a pool wall cleaning mode, and in the pool wall cleaning mode, when the detection assembly detects that the pool wall is a first path, the body moves to the pool wall, and a water discharge of the water absorbing assembly is reduced, or the water absorbing assembly is turned off, until the driving assembly drives the front rolling brush to switch from the first state to the second state, the front rolling brush sequentially cleans the pool bottom, the boundary position between the pool wall and the pool bottom, and at least part of the pool wall along the first path, and the first path comprises an arc-shaped path section connected to the pool bottom and extending to the water line, with the front rolling brush may clean at least a part of the arc-shaped path along the first path.

14. The swimming pool cleaning robot according to claim 13, wherein
the body is provided with a detection assembly, the detection assembly is configured to detect environment information, the environment information comprises wall surface information of the pool wall, in a horizontal direction, a length of the swimming pool cleaning robot is L1, and in a vertical direction, a width of the swimming pool cleaning robot is W1; and
in the pool wall cleaning mode, the body moves to the pool wall, in a case that the pool wall is the first path, and when the swimming pool cleaning robot is unable to continue to move toward a water line along the first path, the front walking wheel and the front rolling brush move to a side away from the first path; and in a case that the pool wall is a second path, the front walking wheel and the front rolling brush continue to move toward the water line along the second path, until the swimming pool cleaning robot reaches the water line, the swimming pool cleaning robot adjusts an effective contact cleaning area of the front rolling brush according to the type of the pool wall, wherein along the forward direction of the swimming pool cleaning robot, the first path is a concave arc surface, the first path has an access opening, a maximum value of a vertical caliber of the access opening is L2, a maximum value of a horizontal caliber of the access opening is W2, L2>L1, W2>W1, and the second path is a vertical wall.

15. The swimming pool cleaning robot according to claim 14, wherein in a vertical direction, the first path has a top, the top of the first path is located on an inside of the access opening, and a distance between the top of the first path and a horizontal plane on which the pool bottom is located is L3, wherein L3>L2, the detection assembly may control the front walking wheel and the front rolling brush to clean an effective cleaning path, which comprises the pool bottom and at least a part of the arc-shaped first path, but excludes the arc-shaped path between the top of the first path and the top of the access opening.

16. The swimming pool cleaning robot according to claim 14, wherein along a vertical upward direction, a curvature of the first path gradually increases, a least one of the detection assembly may control the front walking wheel and the front rolling brush to clean an effective cleaning path, which comprises the pool bottom and at least a part of the arc-shaped first path.

17. The swimming pool cleaning robot according to claim 13, wherein the detection assembly detects a relative position information between the body and the pool wall, so as to dynamically adjust the water discharge of the water absorbing assembly.

18. The swimming pool cleaning robot according to claim 13, wherein in the pool wall cleaning mode, the detection assembly may detect at least a relative position information between the body and the pool wall, the body moves to the pool wall, in a case that the pool wall is the first path, and the swimming pool cleaning robot is unable to continue to move toward the water line along the first path, or before the swimming pool cleaning robot reaches the water line, the front walking wheel and the front rolling brush move to a side away from the pool wall; and in a case that the pool wall is a second path, the front walking wheel and the front rolling brush continue to move toward the water line along the second path, until the swimming pool cleaning robot reaches the water line, wherein along the forward direction of the swimming pool cleaning robot, the first path is a concave arc surface, the first path has an access opening, a maximum value of a vertical caliber of the access opening is L2, a maximum value of a horizontal caliber of the access opening is W2, L2>L1, W2>W1, and the second path is a vertical path.

19. The swimming pool cleaning robot according to claim 13, wherein
the detection assembly detects the wall surface information of the pool wall;
when along a vertical upward direction, a curvature of the first path gradually increases, an effective cleaning path of the front rolling brush comprises the arc-shaped path of a transition between the pool wall and the pool bottom, in configured to increase the contact area between the front rolling brush and the pool wall under the arc-shaped path.

20. A swimming pool cleaning robot, wherein the swimming pool cleaning robot is able to move in water to perform cleaning, and the swimming pool cleaning robot comprises:
a body, wherein along a forward direction of the swimming pool cleaning robot, the body has a front end and a rear end, the body has a housing and an accommodating cavity, the housing is provided with a water inlet communicating with the accommodating cavity, and the water inlet is disposed on a lower surface of the housing;
a water absorbing assembly;
a detection assembly is arranged on the body and is configured to detect environment information, which comprises wall surface information of a pool wall, and the detection assembly comprises one of a distance sensor, an image acquisition sensor, a line laser, an IMU, an odometer;
the robot comprises a pool wall cleaning mode, and in the pool wall cleaning mode, the detection assembly detects the relative position between the body and the pool wall, the body moves towards the pool wall, and a water discharge of the water absorbing assembly is reduced, or the water absorbing assembly is turned off, to decrease the suction force at the water inlet, in order to cause a front part of the body to lift relative to a pool bottom and abuts against the pool wall.

* * * * *